(12) United States Patent
Tanaka

(10) Patent No.: US 8,963,880 B2
(45) Date of Patent: Feb. 24, 2015

(54) DETECTION DEVICE, DETECTION METHOD, PROGRAM AND DISPLAY APPARATUS

(71) Applicant: Japan Display West, Inc., Aichi-Ken (JP)

(72) Inventor: Toshihiko Tanaka, Kanagawa (JP)

(73) Assignee: Japan Display West Inc., Aichi-Ken (JP)

( * ) Notice: Subject to any disclaimer, the term of this patent is extended or adjusted under 35 U.S.C. 154(b) by 181 days.

(21) Appl. No.: 13/722,531

(22) Filed: Dec. 20, 2012

(65) Prior Publication Data

US 2013/0249853 A1 Sep. 26, 2013

(30) Foreign Application Priority Data

Mar. 23, 2012 (JP) ................................. 2012-067534

(51) Int. Cl.
*G06F 3/044* (2006.01)
*G06F 3/041* (2006.01)

(52) U.S. Cl.
CPC .............. *G06F 3/044* (2013.01); *G06F 3/0416* (2013.01)
USPC ...................................... 345/174; 178/18.06

(58) Field of Classification Search
USPC ........................................ 345/174; 178/18.06
See application file for complete search history.

(56) References Cited

U.S. PATENT DOCUMENTS

| 2011/0134076 A1* | 6/2011 | Kida et al. ..................... 345/174 |
| 2012/0075238 A1* | 3/2012 | Minami et al. ................ 345/174 |
| 2012/0120020 A1* | 5/2012 | Lee ................................. 345/174 |

FOREIGN PATENT DOCUMENTS

| JP | 2011-033550 | 2/2011 |
| TW | 201203061 A | 1/2012 |

OTHER PUBLICATIONS

Taiwanese Office Action issued Oct. 22, 2014 for corresponding Taiwanese Application No. 101147683.

* cited by examiner

*Primary Examiner* — Jonathan Boyd
(74) *Attorney, Agent, or Firm* — Rader, Fishman & Grauer PLLC

(57) ABSTRACT

A detection device that detects the approach of a conductor includes: a sensor section including transmission and reception electrodes, and detecting the approach of the conductor to an intersection point where the transmission and reception electrodes intersect with each other; a voltage generating section generating an alternating voltage in which a rise and a fall of a voltage value according to first and second slopes are alternately repeated; a current generating section applying the alternating voltage to the transmission electrode to generate, in the reception electrode, an alternating current having a uniform current value according to the first or second slope while the voltage value of the alternating voltage is rising or falling; a signal generating section generating a detection signal vibrating with an amplitude according to a distance between the intersection point and the conductor; and a detecting section detecting the approach of the conductor to the intersection point.

12 Claims, 15 Drawing Sheets

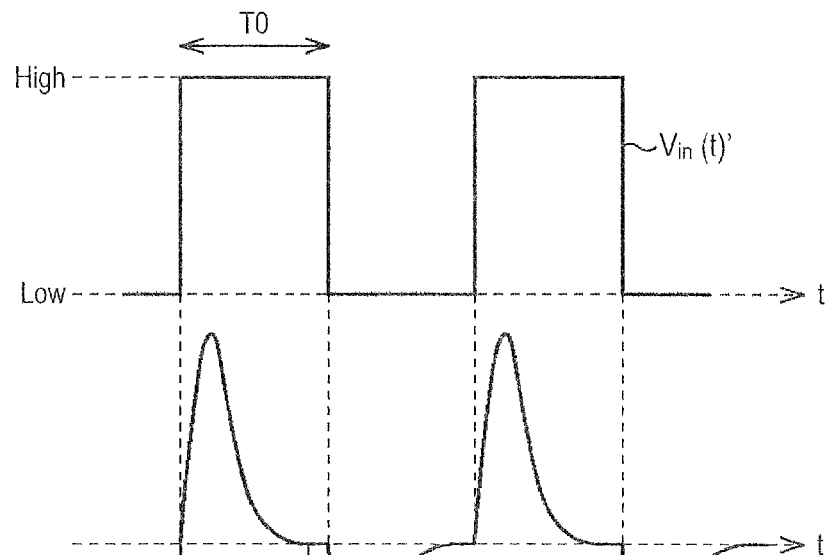
FIG.2A
FIG.2B
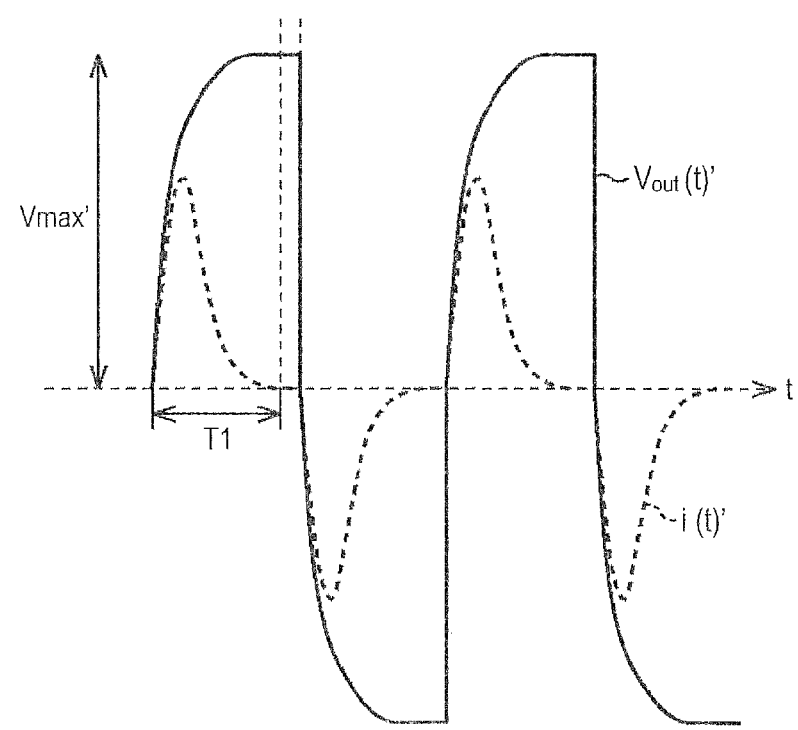
FIG.2C

DETECTION DEVICE, DETECTION METHOD, PROGRAM AND DISPLAY APPARATUS

FIELD

The present disclosure relates to a detection device, a detection method, a program and a display apparatus, and more particularly, to a detection device, a detection method, a program and a display apparatus that are capable of rapidly detecting an approaching finger of a user or the like that is a conductor, for example.

BACKGROUND

For example, there is an electrostatic capacitive touch panel that detects the approach of a finger of a user or the like. This touch panel detects that the finger of the user or the like approaches the touch panel according to a change in electrostatic capacitance of a built-in capacitor (capacitor) (refer to JP-A-2011-33550, for example).

That is, plural transmission electrodes are installed in the touch panel in a row direction, and plural reception electrodes are installed in the touch panel in a column direction in such a manner that the plural reception electrodes respectively intersect with the plural transmission electrodes, for example.

Further, in the touch panel, the approach (referred to as contact in a case where the distance is not present, and proximity adjacency in a case where the distance is present) of the finger of the user or the like is detected at intersection points where the plural transmission electrodes and the plural reception electrodes respectively intersect with each other. That is, in the touch panel, the contact of the finger of the user or the like is detected in a case where the finger of the user or the like approaches the touch panel until the distance becomes D=0, and the proximity adjacency of the finger of the user or the like is detected in a case where the finger of the user or the like approaches the touch panel until the distance becomes D>0.

Specifically, for example, the touch panel applies a drive voltage of square waves to a predetermined transmission electrode, and detects the contact of the finger of the user or the like on the basis of voltage detected in a reception electrode that is connected to the predetermined transmission electrode through a capacitor.

More specifically, for example, if the drive voltage of square waves is applied to the transmission electrode, the voltage of the reception electrode is changed according to the drive voltage applied to the transmission electrode, and is then stabilized into a uniform voltage value. Here, in a case where the stabilized uniform voltage value is equal to or less than a first threshold value, the touch panel detects the proximity adjacency of the finger of the user or the like. Further, in a case where the stabilized uniform voltage value is equal to or less than a second threshold value that is smaller than the first threshold value, the touch panel detects the contact of the finger of the user or the like.

In this regard, time that is necessary until the voltage of the reception electrode is stabilized into the uniform voltage value is proportional to a time constant determined according to a resistor or a capacitor installed in the touch panel. As the time is short, detection time for detecting the approach of the finger of the user or the like is short.

SUMMARY

As described above, in a case where the time constant of the touch panel is relatively large, the voltage of the reception electrode is not rapidly stabilized into the uniform voltage value, and thus, it is difficult to rapidly detect the approach of the finger of the user or the like.

Accordingly, it is desirable to provide a technique that is capable of rapidly detecting the approach of a conductor.

One embodiment of the present disclosure is directed to a detection device that detects the approach of a conductor, including: a sensor section that includes a transmission electrode and a reception electrode that is disposed to intersect with the transmission electrode, and detects the approach of the conductor to an intersection point where the transmission electrode and the reception electrode intersect with each other; a voltage generating section that generates an alternating voltage in which a rise of a voltage value according to a first slope and a fall of the voltage value according to a second slope different from the first slope are alternately repeated; a current generating section that applies the alternating voltage to the transmission electrode to generate, in the reception electrode, an alternating current that has a uniform current value according to the first slope while the voltage value of the alternating voltage is rising and a uniform current value according to the second slope while the voltage value of the alternating voltage is falling; a signal generating section that generates a detection signal that vibrates with an amplitude according to a distance between the intersection point and the conductor on the basis of the alternating current generated in the reception electrode; and a detecting section that detects the approach of the conductor to the intersection point on the basis of the amplitude of the detection signal.

The detection device of the one embodiment of the present disclosure may be configured such that the voltage generating section generates the alternating voltage in which at least one of the voltage value after the rise with the first slope and the voltage value after the fall with the second slope is maintained for a predetermined period, and the signal generating section generates the detection signal in which the amplitude is maintained for the predetermined period, on the basis of the alternating current.

The detection device of the one embodiment of the present disclosure may be configured such that the signal generating section generates the detection signal obtained by integrating the alternating current generated in the reception electrode, and the detecting section detects the approach of the conductor on the basis of comparison of the amplitude of the detection signal with a predetermined threshold value.

The detection device of the one embodiment of the present disclosure may be configured such that the detection device further includes a waveform generating section that generates a square wave signal formed of square waves, and the voltage generating section generates the alternating voltage by integrating the square wave signal generated in the waveform generating section.

The detection device of the one embodiment of the present disclosure may be configured such that the detection device further includes a controller that controls the waveform generating section to change the amplitude of the square waves that form the square wave signal, so as to adjust at least one of the first slope and the second slope.

The detection device of the one embodiment of the present disclosure may be configured such that the voltage generating section generates the alternating voltage having a frequency different from a frequency of noise occurring from the outside.

The detection device of the one embodiment of the present disclosure may be configured such that the transmission electrode and the reception electrode are installed in a display section that displays an image.

The detection device of the one embodiment of the present disclosure may be configured such that the signal generating section generates voltage generated in a resistor that is connected in series to the reception electrode as the detection signal on the basis of the alternating current from the reception electrode.

The detection device of the one embodiment of the present disclosure may be configured such that the signal generating section supplies a different alternating current having the same size as the alternating current to a resistor to generate voltage generated in the resistor as the detection signal using a resistance value of the resistor and a current value of the different alternating current, on the basis the alternating current from the reception electrode.

The one embodiment of the present disclosure is also directed to a detection method using a detection device that detects the approach of a conductor, the detection device including a sensor section that includes a transmission electrode and a reception electrode that is disposed to intersect with the transmission electrode, and detects the approach of the conductor to an intersection point where the transmission electrode and the reception electrode intersect with each other, the method including: generating an alternating voltage in which a rise of a voltage value according to a first slope and a fall of the voltage value according to a second slope different from the first slope are alternately repeated, by the detection device; applying the alternating voltage to the transmission electrode to generate, in the reception electrode, an alternating current that has a uniform current value according to the first slope while the voltage value of the alternating voltage is rising and a uniform current value according to the second slope while the voltage value of the alternating voltage is falling, by the detection device; generating a detection signal that vibrates with an amplitude according to a distance between the intersection point and the conductor on the basis of the alternating current generated in the reception electrode, by the detection device; and detecting the approach of the conductor to the intersection point on the basis of the amplitude of the detection signal, by the detection device.

The one embodiment of the present disclosure is also directed to a program that causes a computer of a detection device that detects the approach of a conductor, including a sensor section that includes a transmission electrode and a reception electrode that is disposed to intersect with the transmission electrode and detects the approach of the conductor to an intersection point where the transmission electrode and the reception electrode intersect with each other, to function as: a voltage generating section that generates an alternating voltage in which a rise of a voltage value according to a first slope and a fall of the voltage value according to a second slope different from the first slope are alternately repeated; a current generating section that applies the alternating voltage to the transmission electrode to generate, in the reception electrode, an alternating current that has a uniform current value according to the first slope while the voltage value of the alternating voltage is rising and a uniform current value according to the second slope while the voltage value of the alternating voltage is falling; a signal generating section that generates a detection signal that vibrates with an amplitude according to a distance between the intersection point and the conductor on the basis of the alternating current generated in the reception electrode; and a detecting section that detects the approach of the conductor to the intersection point on the basis of the amplitude of the detection signal.

According to the one embodiments of the present disclosure, the alternating voltage is generated in which the rise of the voltage value according to the first slope and the fall of the voltage value according to the second slope different from the first slope are alternately repeated, the alternating current that has the uniform current value according to the first slope while the voltage value of the alternating voltage is rising and the uniform current value according to the second slope while the voltage value of the alternating voltage is falling is generated in the reception electrode, by applying the alternating voltage to the transmission electrode, the detection signal that vibrates with the amplitude according to the distance between the intersection point and the conductor is generated on the basis of the alternating current generated in the reception electrode, and the approach of the conductor to the intersection point is detected on the basis of the amplitude of the detection signal.

Another embodiment of the present disclosure is directed to a display apparatus that detects the approach of a conductor to a display section, including: a sensor section that includes a transmission electrode and a reception electrode that is disposed to intersect with the transmission electrode, and detects the approach of the conductor to an intersection point where the transmission electrode and the reception electrode intersect with each other; a voltage generating section that generates an alternating voltage in which a rise of a voltage value according to a first slope and a fall of the voltage value according to a second slope different from the first slope are alternately repeated; a current generating section that applies the alternating voltage to the transmission electrode to generate, in the reception electrode, an alternating current that has a uniform current value according to the first slope while the voltage value of the alternating voltage is rising and a uniform current value according to the second slope while the voltage value of the alternating voltage is falling; a signal generating section that generates a detection signal that vibrates with an amplitude according to a distance between the intersection point and the conductor on the basis of the alternating current generated in the reception electrode; a detecting section that detects the approach of the conductor to the intersection point on the basis of the amplitude of the detection signal; and the display section that is integrally formed with the sensor section and displays an image.

According to this embodiment of the present disclosure, the alternating voltage is generated in which the rise of the voltage value according to the first slope and the fall of the voltage value according to the second slope different from the first slope are alternately repeated, the alternating current that has the uniform current value according to the first slope while the voltage value of the alternating voltage is rising and the uniform current value according to the second slope while the voltage value of the alternating voltage is falling is generated in the reception electrode, by applying the alternating voltage to the transmission electrode, the detection signal that vibrates with the amplitude according to the distance between the intersection point and the conductor is generated on the basis of the alternating current generated in the reception electrode, and the approach of the conductor to the intersection point is detected on the basis of the amplitude of the detection signal.

According to the embodiments of the present disclosure, it is possible to rapidly detect the approach of the conductor.

BRIEF DESCRIPTION OF THE DRAWINGS

FIGS. 2A to 2C are diagrams illustrating an example in which a pulse generating section applies a square wave signal to a transmission electrode;

DETAILED DESCRIPTION

Hereinafter, embodiments according to the present disclosure (hereinafter, referred to as embodiments) will be described. Description thereof will be made in the following order.

1. First embodiment (example in which detection signal is detected using integration circuit)

2. Second embodiment (example in which detection signal is detected using voltage follower circuit)

3. Third embodiment (example in which detection signal is detected using current mirror circuit)

4. Modification example

1. First Embodiment

[Configuration Example of Display Apparatus 1]

Figure 1:
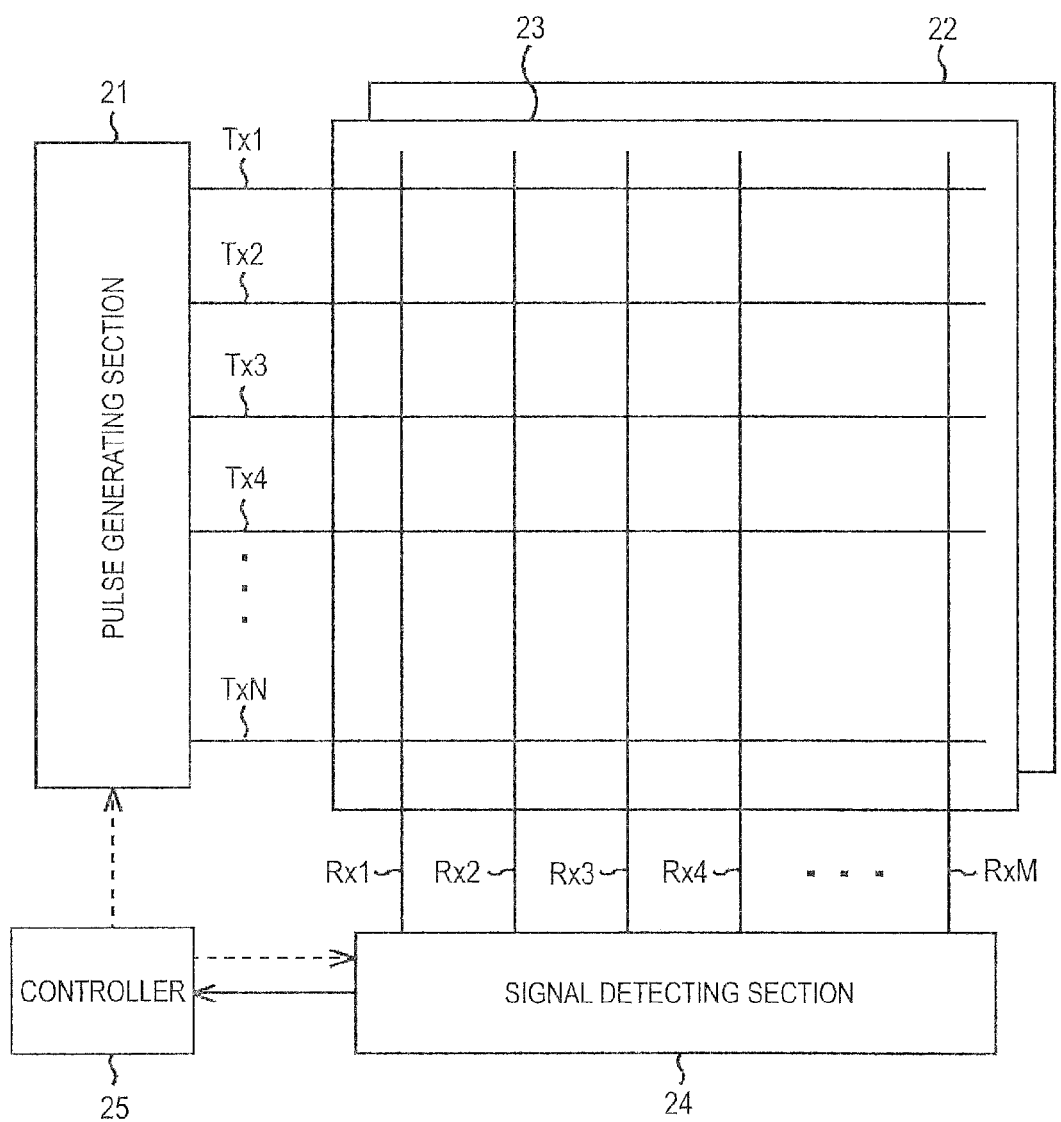
FIG. 1 is a block diagram of a configuration example of a display apparatus according to a first embodiment.

FIG. 1 is a diagram illustrating a configuration example of a display apparatus 1 that is a first embodiment.

The display apparatus 1 includes a pulse generating section 21, a display section 22, a touch panel 23, a signal detecting section 24, and a controller 25. As the display apparatus 1, for example, a television set, a personal computer or the like may be employed. Further, in the display apparatus 1, the pulse generating section 21, the touch panel 23, the signal detecting section 24 and the controller 25 function as a detecting device that detects the approach of a finger of a user or the like to the display section 22.

The pulse generating section 21 generates a triangular wave signal $V_{in}(t)$ (FIG. 3A), for example, as a drive voltage that drives the touch panel 23 under the control of the controller 25. Further, the pulse generating section 21 selects a random transmission electrode $Tx_i$ (i=1, 2, . . . , N) from among plural transmission electrodes $Tx_1$ to $Tx_N$ under the control of the controller 25, and applies (supplies) the generated triangular wave signal $V_{in}(t)$ to the selected transmission electrode $Tx_i$.

The display section 22 includes an LCD (Liquid Crystal Display) or the like, for example, and displays a predetermined image under the control of the controller 25.

The touch panel 23 is installed on a display surface of the display section 22, for example, and is integrally formed with the display section 22. Further, the touch panel 23 includes the plural transmission electrodes $Tx_1$ to $Tx_N$ disposed in the horizontal direction in the figure, and plural reception electrodes $Rx_1$ to $Rx_M$ disposed in the vertical direction in the figure.

The touch panel 23 functions as a sensor for detecting the approach of a finger of a user or the like at each intersection point between the plural transmission electrodes $Tx_1$ to $Tx_N$ and the plural reception electrodes $Rx_1$ to $Rx_M$.

Further, the plural transmission electrodes $Tx_1$ to $Tx_N$ and the plural reception electrodes $Rx_1$ to $Rx_M$ are connected to each other through a capacitor C at each intersection point where the transmission electrodes and the reception electrodes intersect with each other. In the display apparatus 1, the approach of a finger of a user or the like is detected according to a change in electrostatic capacitance of the capacitor C generated due to the approach of the finger of the user or the like.

That is, the change in the electrostatic capacitance of the capacitor C is detected according to a detection signal $V_{out}(t)$ (FIG. 3A) that is indicated by voltage, by the signal detecting section 24, as a change in voltage that is inversely proportional to the electrostatic capacitance. Further, in the controller 25, the approach of the finger of the user or the like is detected on the basis of the detection signal $V_{out}(t)$.

In FIG. 1, the touch panel 23 is installed on the display surface of the display section 22, and thus, the plural transmission electrodes $Tx_1$ to $Tx_N$ and the plural reception electrodes $Rx_1$ to $Rx_M$ are installed outside the display section 22.

However, for example, the plural transmission electrodes $Tx_1$ to $Tx_N$ and the plural reception electrodes $Rx_1$ to $Rx_M$ may be built in the display section 22, and thus, the touch panel 23 and the display section 22 may be formed integrally.

Here, as a method of installing the transmission electrodes $Tx_1$ to $Tx_N$ and the reception electrodes $Rx_1$ to $Rx_M$ in the display section 22, for example, a so-called on-cell method may be used in which the transmission electrodes $Tx_1$ to $Tx_N$ and the reception electrodes $Rx_1$ to $Rx_M$ are formed between a color filter substrate installed in the display section 22 and a polarization plate.

Further, for example, a so-called in-cell method may be used in which the transmission electrodes $Tx_1$ to $Tx_N$ and the reception electrodes $Rx_1$ to $Rx_M$ are inserted into a pixel section that emits light as pixels displayed on the display surface of the display section 22.

In a case where the transmission electrodes $Tx_1$ to $Tx_N$ and the reception electrodes $Rx_1$ to $Rx_M$ are installed in the display section 22, it is possible to make the display apparatus 1 thin, compared with a case where the touch panel 23 is installed on the display surface of the display section 22.

Further, in a case where the transmission electrodes $Tx_1$ to $Tx_N$ and the reception electrodes $Rx_1$ to $Rx_M$ are installed in the display section 22, for example, a sheet or the like for installing the transmission electrodes $Tx_1$ to $Tx_N$ and the reception electrodes $Rx_1$ to $Rx_M$ on the display surface of the display section 22 may be omitted, and it is thus possible to realize a light weight of the display apparatus 1.

The signal detecting section 24 selects a random reception electrode $Rx_j$ (j=1, 2, ..., M) from among the plural reception electrodes $Rx_1$ to $Rx_M$ under the control of the controller 25. Further, the signal detecting section 24 converts an alternating current i(t) (FIG. 3A) generated in the selected reception electrode $Rx_j$ into the detection signal $V_{out}(t)$ that is a voltage for detecting the approach of the finger of the user or the like to the touch panel 23.

Further, the signal detecting section 24 samples and holds the detection signal $V_{out}(t)$ after conversion at a predetermined sampling frequency. Further, the signal detecting section 24 AD(analog/digital)-converts the detection signal $V_{out}(t)$ that is an analogue signal that is sampled and held into a detection signal $V_{out}(t)$ that is a digital signal, and supplies the result to the controller 25.

The controller 25 controls the pulse generating section 21, the display section 22 and the signal detecting section 24. Further, the controller 25 detects the approach of the finger of the user or the like at an intersection point between the transmission electrode $Tx_i$ and the reception electrode $Rx_j$ on the basis of the amplitude of the detection signal $V_{out}(t)$ from the signal detecting section 24.

Here, the amplitude of the detection signal $V_{out}(t)$ represents the size of ½ of the width at which the detection signal $V_{out}(t)$ vibrates.

Further, the amplitude of the detection signal $V_{out}(t)$ is decreased as the distance from the intersection point between the transmission electrode $Tx_i$ and the reception electrode $Rx_j$ to a conductor such as a finger of the user or the like is short. The amplitude of the detection signal $V_{out}(t)$ is decreased as the conductor that approaches to the intersection point between the transmission electrode $Tx_i$ and the reception electrode $Rx_j$ is large in size.

Accordingly, the controller 25 detects the approach of the finger of the user or the like on the basis of the amplitude of the detection signal $V_{out}(t)$ from the signal detecting section 24. That is, for example, in a case where the amplitude of the detection signal $V_{out}(t)$ is equal to or less than a first threshold value, the controller 25 detects the proximity adjacency of the finger of the user or the like, and in a case where the amplitude of the detection signal $V_{out}(t)$ is equal to or less than a second threshold value that is smaller than the first threshold value, the controller 25 detects contact of the finger of the user or the like.

The first threshold value and the second threshold value are values that are irrelevant to the first threshold value and the second threshold value mentioned in the related art.

Hereinafter, for ease of description, it is assumed that the controller 25 detects the approach of the finger of the user or the like on the basis of whether the amplitude of the detection signal $V_{out}(t)$ from the signal detecting section 24 is equal to or less than a predetermined threshold value (for example, a threshold value TH' or a threshold value TH to be described later).

That is, for example, in a case where the predetermined threshold value corresponds to the first threshold value, it is assumed that the controller 25 detects the proximity adjacency of the finger of the user or the like on the basis of whether the amplitude of the detection signal $V_{out}(t)$ from the signal detecting section 24 is equal to or less than the predetermined threshold value.

Further, for example, in a case where the predetermined threshold value corresponds to the second threshold value, it is assumed that the controller 25 detects the contact of the finger of the user or the like on the basis of whether the amplitude of the detection signal $V_{out}(t)$ from the signal detecting section 24 is equal to or less than the predetermined threshold value.

Further, in the first embodiment, it is assumed that the detection of the approach of the finger of the user or the like is performed for each vertical blanking period from the time when an image is displayed on the display section 22 to the time until the next image is displayed. However, the period when the detection of the approach of the finger of the user or the like is performed is not limited thereto.

That is, the detection of the approach of the finger of the user or the like may be performed during a random period. Specifically, for example, the detection of the approach of the finger of the user or the like may be performed for at least one period of the vertical blanking period and a horizontal blanking period from the time when a predetermined row that forms an image is displayed to the time until the next row is displayed.

Further, the detection of the approach of the finger of the user or the like may be performed for only an odd-numbered vertical blanking period, for example, without being performed for each vertical blanking period. This is similarly applied to the horizontal blanking period.

The controller 25 performs a process according to the detection result based on the amplitude of the detection signal $V_{out}(t)$ from the signal detecting section 24. That is, in a case where the controller 25 detects that the finger of the user or the like is in contact with a predetermined icon displayed on the display section 22 through the touch panel 23, the controller 25 activates an application corresponding to the predetermined icon. Further, the controller 25 displays an activated screen of the activated application on the display section 22.

In the present embodiment, it is important for the pulse generating section 21 to apply the triangular wave signal $V_{in}(t)$ having the waveform of triangular waves to the transmission electrode $Tx_i$, for example, instead of a square wave signal $V_{in}(t)'$ (FIG. 2A) having the waveform of square waves.

Accordingly, referring to FIGS. 2A to 3C, comparing a case where the pulse generating section 21 applies the square wave signal $V_{in}(t)'$ to the transmission electrode $Tx_i$ with a case where the pulse generating section 21 applies the triangular wave signal $V_{in}(t)$ to the transmission electrode $Tx_i$, an advantage in a case where the triangular wave signal $V_{in}(t)$ is applied to the transmission electrode $Tx_i$ will be described.

In order to distinguish the square wave signal $V_{in}(t)'$ from the triangular wave signal $V_{in}(t)$, the prime (dash) "'" is assigned to the square wave signal $V_{in}(t)'$. This is similarly applied to an alternating current i(t)', a detection signal $V_{out}(t)'$, and the like.

Next, FIGS. 2A to 2C show an example in which the pulse generating section 21 applies the square wave signal $V_{in}(t)'$ to the transmission electrode $Tx_i$.

FIG. 2A shows an example of the square wave signal $V_{in}(t)'$ applied to the transmission electrode $Tx_i$. The square wave signal $V_{in}(t)'$ alternately repeats "High" and "Low" for each pulse width T0.

FIG. 2B shows an example of the alternating current $i(t)'$ flowing in the reception electrode $Rx_j$ as the square wave signal $V_{in}(t)'$ shown in FIG. 2A is applied to the transmission electrode $Tx_i$. In the alternating current $i(t)'$, electric current flows for a period T1 that is shorter than the pulse width T0, in the pulse width T0, and then, a value of the electric current becomes uniform.

FIG. 2C shows an example of the detection signal $V_{out}(t)' = \int i(t)' dt$ that is a voltage obtained by integrating the alternating current $i(t)'$ shown in FIG. 2B with time t.

The pulse generating section 21 generates the square wave signal $V_{in}(t)'$ shown in FIG. 2A, and applies the result to the transmission electrode $Tx_i$ that is electrically connected thereto.

Thus, the alternating current $i(t)'$ shown in FIG. 2B is generated in the reception electrode $Rx_j$. The reception electrode $Rx_j$ supplies the alternating current $i(t)'$ generated in the reception electrode $Rx_j$ by the pulse generating section 21 to the signal detecting section 24.

The signal detecting section 24 integrates the electric current $i(t)'$ supplied from the reception electrode $Rx_j$ with the time t, to generate the detection signal $V_{out}(t)'$ shown in FIG. 2C. Further, the signal detecting section 24 samples a voltage value $V_{max}'$ (amplitude of the detection signal $V_{out}(t)'$) from the generated detection signal $V_{out}(t)'$ as a maximum value, to supply the result to the controller 25.

The controller 25 detects the approach of the finger of the user or the like in the vicinity of the intersection point between the transmission electrode $Tx_i$ and the reception electrode $Rx_j$, on the basis of whether the voltage value $V_{max}'$ from the signal detecting section 24 is equal to or less than the predetermined threshold value TH'.

That is, for example, in a case where the voltage value $V_{max}'$ from the signal detecting section 24 is equal to or less than the predetermined threshold value TH', the controller 25 detects that the approach of the finger of the user or the like is performed in the vicinity of the intersection point between the transmission electrode $Tx_i$ and the reception electrode $Rx_j$. Further, in a case where the voltage value $V_{max}'$ from the signal detecting section 24 is not equal to or less than the predetermined threshold value TH', the controller 25 detects that the approach of the finger of the user or the like is not performed in the vicinity of the intersection point between the transmission electrode $Tx_i$ and the reception electrode $Rx_j$.

Here, in FIG. 2C, the period T1 is a period that is necessary until the detection signal $V_{out}(t)'$ is stabilized into the uniform voltage value $V_{max}'$ by integrating the alternating current $i(t)'$. The period T1 is as long as a time constant of the display apparatus 1, particularly, a time constant of the reception electrode $Rx_j$ is large.

Accordingly, in a case where the time constant of the reception electrode $Rx_j$ is relatively large, when the square wave signal $V_{in}(t)'$ is applied to the transmission electrode $Tx_i$, the period T1 is lengthened. Thus, the approach of the finger of the user or the like may not be detected in a short time.

Further, since it is necessary to widely set the pulse width T0 (>T1) of the square wave signal $V_{in}(t)'$ according to the period T1, the number of detections in which the approach of the finger of the user or the like is detected is decreased for a predetermined time.

Thus, the pulse generating section 21 applies the triangular wave signal $V_{in}(t)$ to the transmission electrode $Tx_i$, for example, instead of the square wave signal $V_{in}(t)'$.

Accordingly, the alternating current $i(t)$ (FIGS. 3A to 3C) generated in the reception electrode $Rx_j$ is set to a uniform electric current $i = C \times (dV/dt)$ that is proportional to the electrostatic capacitance (electrostatic capacitance C) of the capacitor C in the intersection point between the transmission electrode $Tx_i$ and the reception electrode $Rx_j$. Accordingly, the signal detecting section 24 may generate the detection signal $V_{out}(t)$ during the uniform period, regardless of wiring resistance of the reception electrode $Rx_j$. Thus, it is possible to perform the detection of the approach of the finger of the user or the like for a relatively short time.

Further, since the signal detecting section 24 may generate the detection signal $V_{out}(t)$ during the uniform period, regardless of the wiring resistance of the reception electrode $Rx_j$, the pulse generating section 21 is able to freely set the pulse width of the triangular wave that forms the triangular wave signal $V_{in}(t)$, compared with a case where the square wave signal $V_{in}(t)'$ is applied.

Thus, in the pulse generating section 21, in a case where the triangular wave signal $V_{in}(t)$ is applied, by narrowing the pulse width of the triangular wave that forms the triangular wave signal $V_{in}(t)$, it is possible to increase the number of detections for a predetermined time.

In this case, the controller 25 may detect the approach of the finger of the user or the like on the basis of the amplitude of the detection signal $V_{out}(t)$ in a short time, and to increase the number of detections in which the approach of the finger of the user or the like is detected.

Figure 3A:
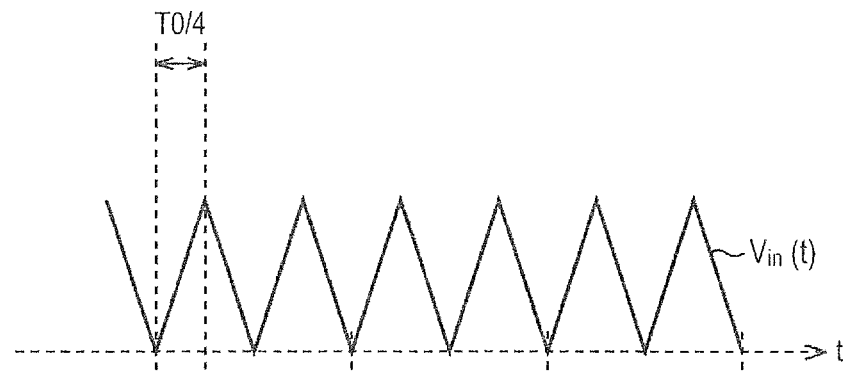
FIGS. 3A to 3C are diagrams illustrating an example in which a pulse generating section applies a triangular wave signal to a transmission electrode.
Figure 3B:
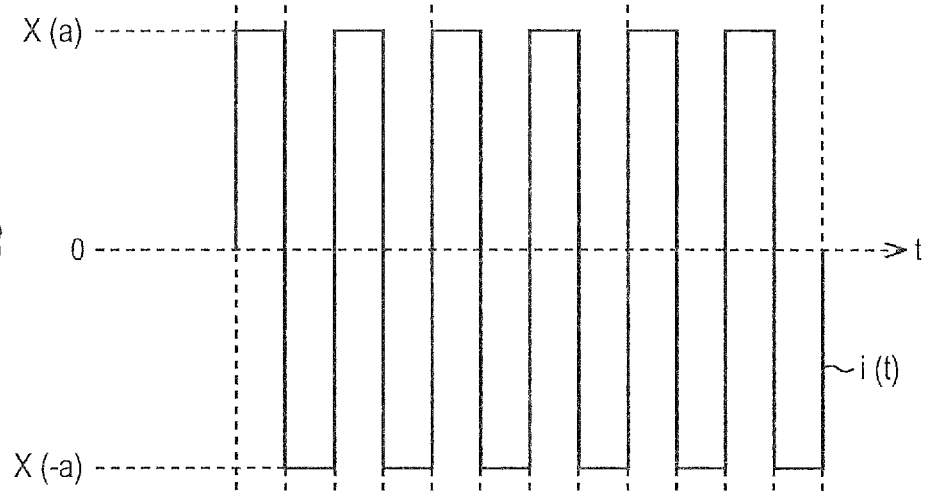
Figure 3C:
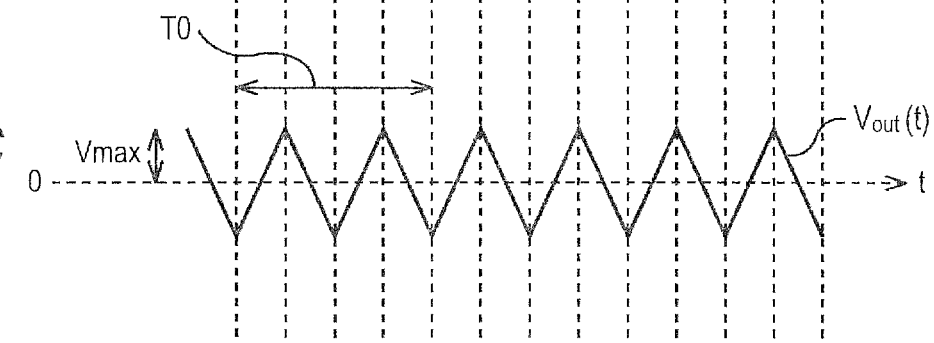

Next, FIGS. 3A to 3C show an example in which the pulse generating section 21 applies the triangular wave signal $V_{in}(t)$ to the transmission electrode $Tx_i$.

FIG. 3A shows an example of the triangular wave signal $V_{in}(t)$ applied to the transmission electrode $Tx_i$. The triangular wave signal $V_{in}(t)$ is configured by triangular waves of a pulse width T0/2 that is narrower than the pulse width T0 of the square wave signal $V_{in}(t)'$, for example.

Further, in FIG. 3A, the triangular wave signal $V_{in}(t)$ alternately repeats a rise with a predetermined uniform slope a (>0) and a fall with a predetermined uniform slope −a at a cycle of a period T0/4.

FIG. 3B shows an example of the alternating current $i(t)$ generated in the reception electrode $Rx_j$ as the triangular wave signal $V_{in}(t)$ shown in FIG. 3A is applied to the transmission electrode $Tx_i$.

In FIG. 3B, the alternating current $i(t)$ is set to a uniform electric current value x (a) (>0) according to the slope a in a case where the voltage value of the triangular wave signal $V_{in}(t)$ is changed with a slope a, and is set to a uniform electric current value x (−a) according to a slope −a in a case where the voltage value of the triangular wave signal $V_{in}(t)$ is changed with the slope −a.

FIG. 3C shows an example of a detection signal $V_{out}(t) = \int i(t) dt$ that is a voltage obtained by integrating the alternating current $i(t)$ shown in FIG. 3B with time t. In FIG. 3C, the voltage value of the detection signal $V_{out}(t)$ alternately takes a maximum value $V_{max}$ and a minimum value $V_{min}$ (=−$V_{max}$) at a cycle of the period T0/4, with reference to the voltage value 0 indicated by a dotted line. Accordingly, the maximum value $V_{max}$ corresponds to the amplitude of the detection signal $V_{out}(t)$.

The pulse generating section 21 generates the triangular wave signal $V_{in}(t)$ as shown in FIG. 3A, and applies the result to the transmission electrode $Tx_i$ that is electrically connected thereto.

Thus, the alternating current $i(t)$ as shown in FIG. 3B is generated in the reception electrode $Rx_j$. The reception electrode $Rx_j$ supplies the alternating current $i(t)$ generated in the reception electrode $Rx_j$ to the signal detecting section 24.

The signal detecting section 24 integrates the alternating current $i(t)$ supplied from the reception electrode $Rx_j$ with time t, to generate the detection signal $V_{out}(t)$ as shown in FIG. 3C. Further, the signal detecting section 24 samples and holds the voltage value $V_{max}$ (amplitude of the detection signal $V_{out}(t)$) that is the maximum value on the basis of the generated detection signal $V_{out}(t)$ and performs AD (Analog/Digital) conversion, and then, supplies the result to the controller 25.

The controller 25 detects the approach of the finger of the user or the like at the intersection point between the transmission electrode $Tx_i$ and the reception electrode $Rx_j$, on the basis of whether the voltage value $V_{max}$ from the signal detecting section 24 is equal to or less than the predetermined threshold value TH (>0).

Here, the signal detecting section 24 may sample and hold the voltage value $V_{min}$ ($=-V_{max}$) that is the minimum value on the basis of the generated detection signal $V_{out}(t)$ and may perform AD (Analog/Digital) conversion, and then, may supply the result to the controller 25. In this case, the controller 25 detects the approach of the finger of the user or the like on the basis of whether the voltage value $V_{min}$ from the signal detecting section 24 is equal to or more than the threshold value $-TH$, or the negative value $V_{max}$ ($=-V_{min}$) of the voltage value $V_{min}$ is equal to or less than the threshold value TH.

Since the pulse generating section 21 applies the triangular wave signal $V_{in}(t)$ that varies with the uniform slope, as shown in FIG. 3A, to the transmission electrode $Tx_i$, the alternating current $i(t)$ generated in the reception electrode $Rx_j$ becomes a uniform displacement current in which the electric current value varies with a uniform displacement, as shown in FIG. 3B.

Thus, the signal detecting section 24 may sample and hold the voltage value $V_{max}$ that is the maximum value of the detection signal $V_{out}(t)$ as shown in FIG. 3C, for each uniform period $T0/2$, regardless of the wiring resistance of the reception electrode $Rx_j$. The signal detecting section 24 AD-converts the sampled and held voltage value $V_{max}$ and supplies the result to the controller 25.

Accordingly, the controller 25 may detect the approach of the finger of the user or the like in a short time, on the basis of whether the voltage value $V_{max}$ supplied for each uniform period $T0/2$ from the signal detecting section 24 is equal to or less than the threshold value TH.

On the other hand, in a case where the pulse generating section 21 applies the square wave signal $V_{in}(t)'$ as shown in FIG. 2A to the transmission electrode $Tx_i$, the period T1 that is necessary until the voltage value $V_{max}'$ is sampled and held by the signal detecting section 24 is lengthened according to the time constant of the reception electrode $Rx_j$, that is, the wiring resistance of the reception electrode $Rx_j$, for example.

That is, in this case, since the signal detecting section 24 samples and holds the voltage value $V_{max}'$ after waiting for the period T1 that varies according to the time constant of the reception electrode $Rx_j$, as shown in FIG. 2C, the signal detecting section 24 is not able to detect the approach of the finger of the user or the like in a short time due to the time constant of the reception electrode $Rx_j$.

Figure 4:
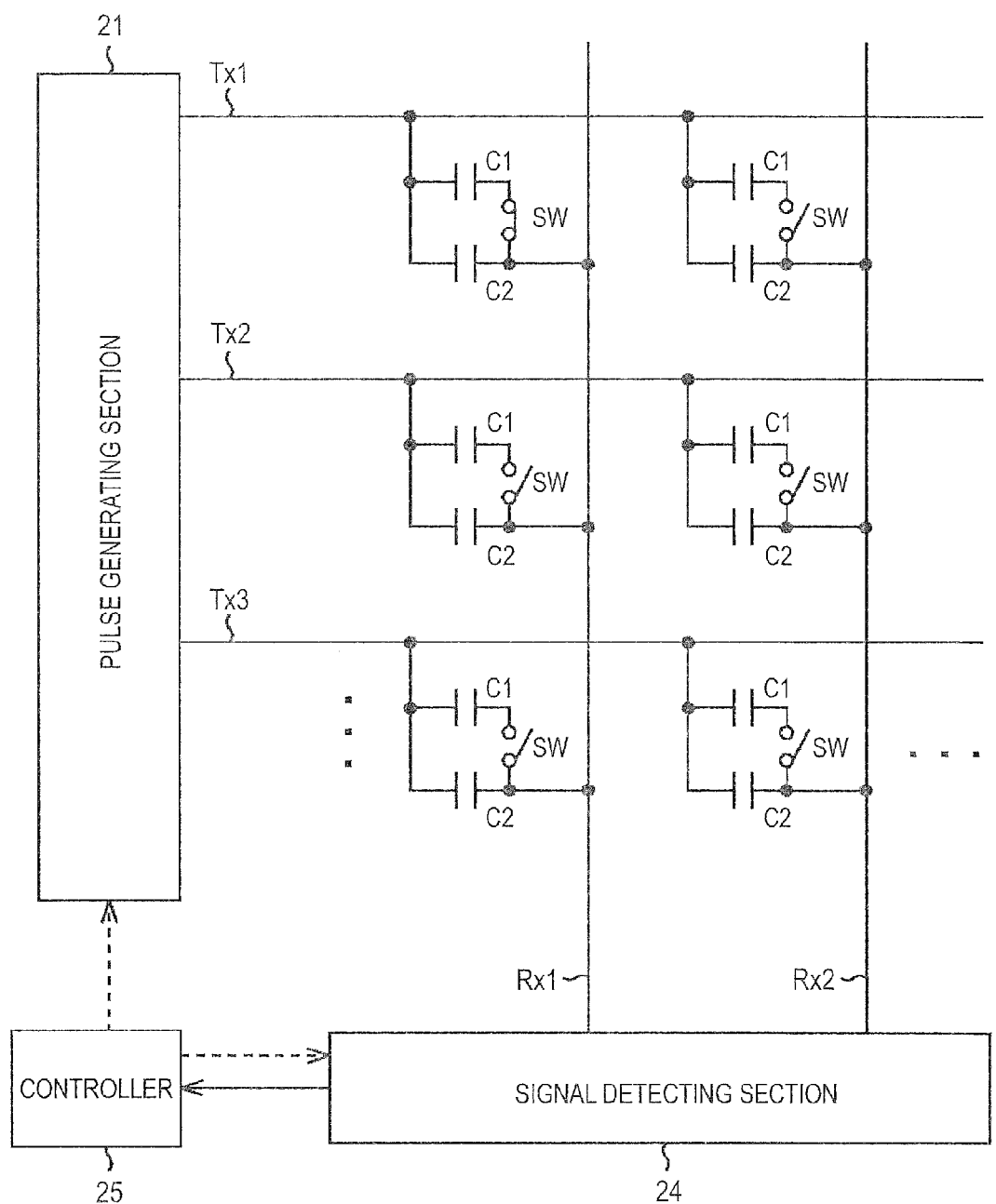
FIG. 4 is a block diagram illustrating a detailed configuration example of a transmission electrode and a reception electrode.

Next, FIG. 4 shows a detailed configuration example of the transmission electrodes $Tx_1$ to $Tx_N$ and the reception electrodes $Rx_1$ to $Rx_M$ installed in the touch panel 23.

In FIG. 4, between each of the transmission electrodes $Tx_1$ to $Tx_N$ and each of the reception electrodes $Rx_1$ to $Rx_M$, a parallel circuit in which two capacitors $C_1$ and $C_2$ are connected in parallel through a switch SW is installed. In practice, only one capacitor C is installed between each of the transmission electrodes $Tx_1$ to $Tx_N$ and each of the reception electrodes $Rx_1$ to $Rx_M$. Further, when the finger of the user or the like approaches the intersection point, the electrostatic capacitance of the capacitor C at the intersection point is increased.

That is, in FIG. 4, the capacitance of the capacitor C when the finger of the user or the like does not approach the intersection point is expressed as the capacitance $C_2$, and the capacitance that is increased as the finger of the user or the like approaches thereto is expressed as the capacitance $C_1$.

Thus, in FIG. 4, if the finger of the user or the like approaches to a predetermined intersection point, the switch SW of the parallel circuit installed at the predetermined intersection point enters an ON state, and the capacitor C at the predetermined intersection point is changed from the state of the capacitance $C_2$ to the state of the capacitances $C_1$ and $C_2$ that are arranged in parallel.

Further, in a state where the finger of the user or the like does not approach thereto, the switch SW of the parallel circuit installed at the predetermined intersection point enters an OFF state, and the capacitor C at the predetermined intersection point is changed to the state of the capacitance $C_2$.

In FIG. 4, only the switch SW of the parallel circuit installed at the intersection point between the transmission electrode $Tx_1$ and the reception electrode $Rx_1$ from among the plural switches SW shown in FIG. 4 enters the ON state. Accordingly, FIG. 4 shows a state where the finger of the user or the like approaches the intersection point between the transmission electrode $Tx_1$ and the reception electrode $Rx_1$.

In the first embodiment, the detection of the approach of the finger of the user or the like is assumed to be performed during the vertical blanking period of the image displayed on the display section 22, for example. Here, the detection of the approach of the finger of the user or the like may be performed during the horizontal blanking period, for example, instead of the vertical blanking period, as described above.

That is, for example, the controller 25 causes the pulse generating section 21 to select the transmission electrode $Tx_i$ (i is an integer of 1, 2, . . . , N), and causes the signal detecting section 24 to select the reception electrode $Rx_j$ (j is an integer of 1, 2, . . . , M).

The pulse generating section 21 is electrically connected to the transmission electrode $Tx_i$ that is selected under the control of the controller 25 from among the plural transmission electrodes $Tx_1$ to $Tx_N$, and sets the remaining transmission electrode $Tx_{i'}$ (i'≠i) to a predetermined fixed voltage. The pulse generating section 21 may ground the remaining transmission electrode $Tx_{i'}$, for example, to achieve the fixed voltage, or may set the remaining transmission electrode $Tx_{i'}$ to the fixed voltage using a method different from the method of grounding the remaining transmission electrode $Tx_{i'}$.

Further, the pulse generating section 21 generates the triangular wave signal $V_{in}(t)$, for example, as a voltage, and applies the generated triangular wave signal $V_{in}(t)$ to the transmission electrode $Tx_i$.

The signal detecting section 24 is electrically connected to only the reception electrode $Rx_j$ that is selected under the control of the controller 25 from among the plural reception electrodes $Rx_1$ to $Rx_M$. Further, the signal detecting section 24 generates the detection signal $V_{out}(t)$, on the basis of the alternating current $i(t)$ supplied from the connected reception electrode $Rx_j$, and then, samples and holds the voltage value $V_{max}$ of the generated detection signal $V_{out}(t)$, performs AD conversion, and supplies the result to the controller 25.

The controller 25 detects the approach of the finger of the user or the like at the intersection point in which the transmission electrode $Tx_i$ and the reception electrode $Rx_j$ intersect with each other on the basis of the voltage value $V_{max}$ from the signal detecting section 24.

Next, the controller 25 causes the signal detecting section 24 to select a new reception electrode $Rx_{j+1}$ from among the plural reception electrodes $Rx_1$ to $Rx_M$.

Further, the controller 25 controls the pulse generating section 21 and the signal detecting section 24 to detect the approach of the finger of the user or the like at the intersection point where the transmission electrode $Tx_i$ and the reception electrode $Rx_{j+1}$ intersect with each other, in a similar way to the above-described case.

The controller 25 causes the signal detecting section 24 to sequentially select the reception electrodes $Rx_1, Rx_2, \ldots, Rx_M$ in a state where the pulse generating section 21 selects the transmission electrode $Tx_i$, to detect the approach of the finger of the user or the like.

In a case where the reception electrodes $Rx_1, Rx_2, \ldots, Rx_M$ are all selected in a state where the pulse generating section 21 selects the transmission electrode $Tx_i$, the controller 25 causes the pulse generating section 21 to select a new transmission electrode $Tx_{i+1}$.

Further, the controller 25 causes the signal detecting section 24 to sequentially select the reception electrodes $Rx_1, Rx_2, \ldots, Rx_M$ in a state where the pulse generating section 21 selects the transmission electrode $Tx_{i+1}$, to detect the approach of the finger of the user or the like.

Then, the controller 25 causes the pulse generating section 21 to select a new transmission electrode $Tx_{i+2}$, and performs the same process. Finally, the controller 25 causes the pulse generating section 21 to select the transmission electrode $Tx_N$, and causes the signal detecting section 24 to sequentially select the reception electrodes $Rx_1, Rx_2, \ldots, Rx_M$ in a state where the transmission electrode $Tx_N$ is selected, to detect the approach of the finger of the user or the like.

The controller 25 determines the movement or the like of the finger of the user or the like on the basis of the detection result at each intersection point, and performs a process according to the determination result. The controller 25 repeats the same process for each of the subsequent vertical blanking periods.

Further, the controller 25 may detect the approach of the finger of the user or the like using only the even-numbered transmission electrodes $Tx_2, Tx_4, \ldots$, and the even-numbered reception electrodes $Rx_2, Rx_4, \ldots$, without the use of all of the transmission electrodes $Tx_1$ to $Tx_N$ and the reception electrodes $Rx_1$ to $Rx_M$.

Figure 5:
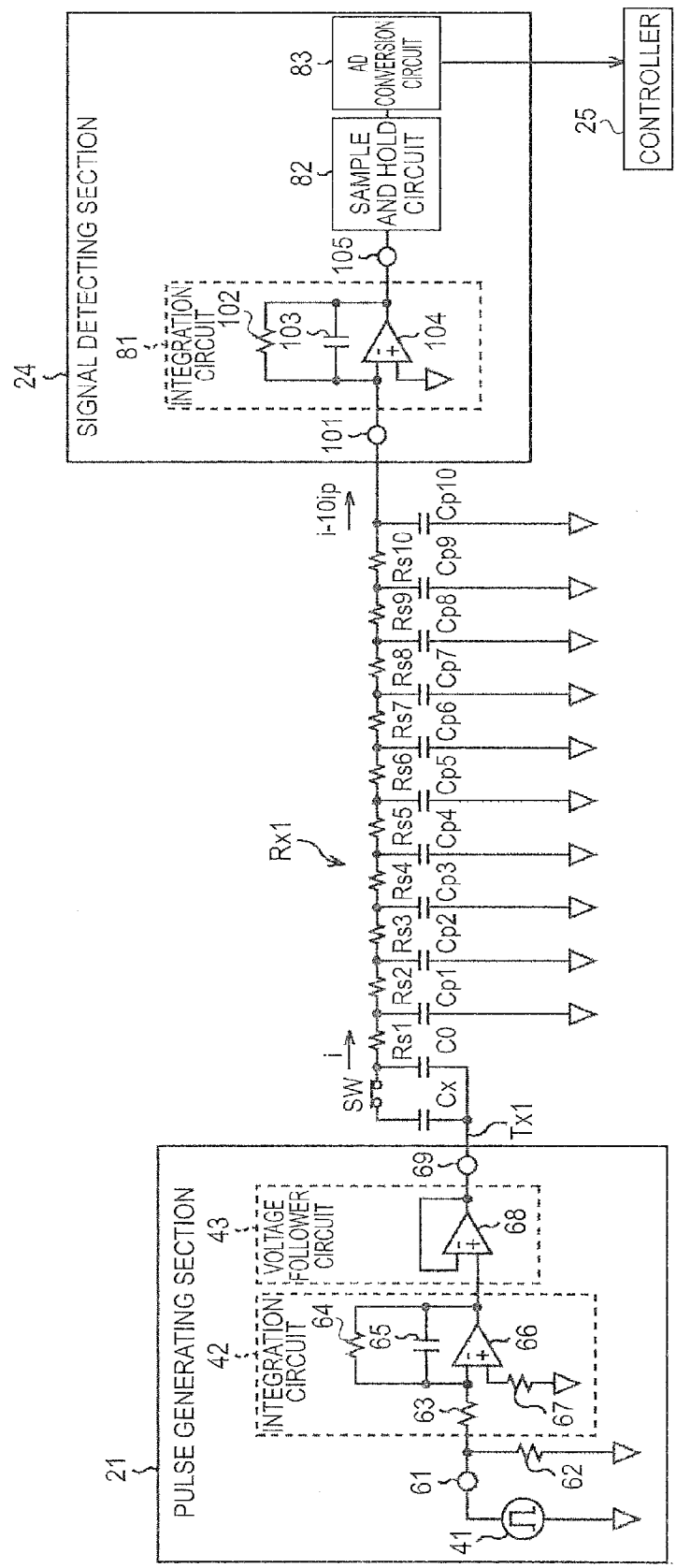
FIG. 5 is a block diagram illustrating an example in which a transmission electrode $Tx_1$ is connected to a pulse generating section and a reception electrode $Rx_1$ is connected to a signal detecting section.

Next, FIG. 5 shows an example in which the transmission electrode $Tx_1$ is connected to the pulse generating section 21 and only the reception electrode $Rx_1$ is electrically connected to the signal detecting section 24.

That is, as shown in FIG. 4, FIG. 5 shows an example in which only the switch SW of the parallel circuit installed between the transmission electrode $Tx_1$ and the reception electrode $Rx_1$ from among the parallel circuits that are respectively installed between the transmission electrodes $Tx_1$ to $Tx_N$ and the reception electrodes $Rx_1$ to $Rx_M$ is turned on (in a case where the approach of the finger of the user or the like is present) and the switches SW of the remaining parallel circuits are turned off (in a case where the approach of the finger of the user or the like is not present).

That is, FIG. 5 shows an example in which the finger of the user or the like approaches only the intersection point between the transmission electrode $Tx_1$ and the reception electrode $Rx_1$ from among the respective intersection points between the transmission electrodes $Tx_1$ to $Tx_N$ and the reception electrodes $Rx_1$ to $Rx_M$.

Further, in FIG. 5, capacitors $C_x$ and $C_0$ correspond to the capacitors $C_1$ and $C_2$ (FIGS. 2A to 2C) of the parallel circuit installed between the transmission electrode $Tx_1$ and the reception electrode $Rx_1$, respectively.

In FIG. 5, for simplification of the figure, it is assumed that the transmission electrodes installed in the touch panel 23 correspond to only eleven transmission electrodes $Tx_1$ to $Tx_{11}$. Accordingly, each of the transmission electrodes $Tx_2$ to $Tx_{11}$ is connected to capacitors $Cp_1$ to $Cp_{10}$ at one end thereof, and is grounded at the other end thereof.

Further, in FIG. 5, only a case where the transmission electrode $Tx_1$ is connected to the pulse generating section 21 and the reception electrode $Rx_1$ is connected to the signal detecting section 24, respectively, is illustrated. Other combinations of the transmission electrodes and the reception electrodes are similar to the case of the combination of the transmission electrode $Tx_1$ and the reception electrode $Rx_1$, description thereof will be omitted.

Further, ten resistors $Rs_1$ to $Rs_{10}$ represent distribution resistors of the reception electrode $Rx_1$. Here, all the resistors $Rs_1$ to $Rs_{10}$ have the same resistance value, all the capacitors $Cp_1$ to $Cp_{10}$ have the same electrostatic capacitance and are grounded at one end thereof.

The pulse generating section 21 includes a waveform generator 41, an integration circuit 42 and a voltage follower circuit 43.

One end of the waveform generator 41 is grounded. Further, the other end of the waveform generator 41 is connected to the other end of a resistor 62 that is grounded at one end thereof through a connection terminal 61, and is connected to the integration circuit 42 that includes a resistor 63, a resistor 64, a capacitor 65, an operational amplifier 66, and a resistor 67.

In the integration circuit 42, an end of the resistor 63 is connected to the connection terminal 61, and the other end thereof is connected to an inverting input terminal of the operational amplifier 66. The resistor 64 and the capacitor 65 are connected to the inverting input terminal and an output terminal of the operational amplifier 66 in the state of being connected in parallel.

A non-inverting input terminal of the operational amplifier 66 is connected to one end of the resistor 67 that is grounded at the other end thereof. Further, the output terminal of the operational amplifier 66 is connected to a non-inverting input terminal of an operational amplifier 68 that functions as the voltage follower circuit 43.

An output terminal of the operational amplifier 68 is connected to a connection terminal 69. Further, the inverting input terminal of the operational amplifier 68 is connected to the output terminal of the operational amplifier 68.

The waveform generator 41 generates a square wave signal $V_0(t)$ that is indicated by voltage, for example, under the control of the controller 25, and supplies the result to the integration circuit 42 through the connection terminal 61.

Figure 6:
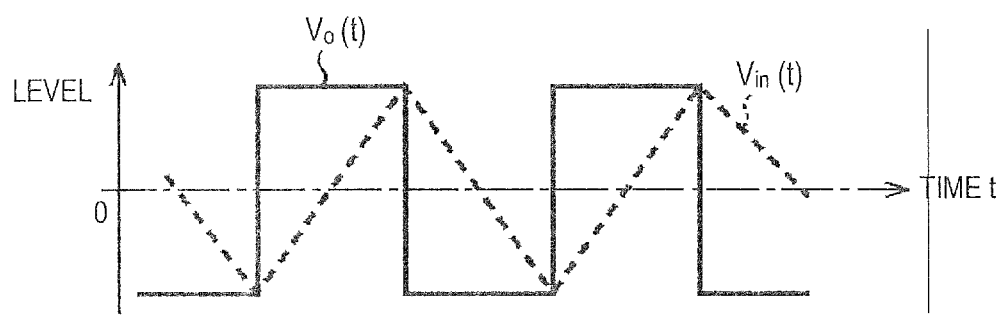
FIG. 6 is a diagram illustrating an example in which an integration circuit integrates a square wave signal to generate a triangular wave signal.

The integration circuit 42 integrates the square wave signal $V_0(t)$ supplied through the connection terminal 61 from the waveform generator 41 with the time t, to generate a triangular wave signal $V_{in}(t)$ that is indicated by voltage, as shown in FIG. 6, for example, and outputs the result to the voltage follower circuit 43. In FIG. 6, the horizontal axis represents the time t, and the vertical axis represents the signal level (voltage value).

Here, if the waveform generator 41 generates the square wave signal $V_0(t)$ in which the amplitude of the square wave is large and supplies the result to the integration circuit 42 through the connection terminal 61, the integration circuit 42 may generate the triangular wave signal $V_{in}(t)$ in which the slope of the triangular wave is steep.

That is, the controller 25 may control the waveform generator 41 to change the amplitude (size) of the square wave signal $V_0(t)$ output from the waveform generator 41, to thereby adjust the slope of the triangular wave (at least one slope of a and −a) of the triangular wave signal $V_{in}(t)$ output from the integration circuit 42.

Thus, for example, the controller 25 may adjust the slope of the triangular wave of the triangular wave signal $V_{in}(t)$, to thereby increase and decrease the number of detections. Accordingly, it is possible to randomly set the detection sensitivity when the approach of the finger of the user or the like is detected.

In a case where the controller 25 detects the approach of the finger of the user or the like at the intersection point between the transmission electrode $Tx_1$ and the reception electrode $Rx_j$ plural times of detections, as the number of detections is large, noise is reduced by the power of ½ of the number of detections, and thus, the detection sensitivity is enhanced.

For example, in a case where the controller 25 detects the approach of the finger of the user or the like to the touch panel 23 using all of the transmission electrodes $Tx_1$ to $Tx_N$ and the reception electrodes $Rx_1$ to $Rx_M$, it is possible to set the detection sensitivity to be low by smoothing the slope of the triangular wave of the triangular wave signal $V_{in}(t)$.

Further, for example, the controller 25 may use the transmission electrodes $Tx_1$ to $Tx_N$ and the reception electrodes $Rx_1$ to $Rx_M$ in the state of being thinned out, and thus, in a case where the approach of the finger of the user or the like to the touch panel 23 is detected, it is possible to make steep the slope of the triangular wave of the triangular wave signal $V_{in}(t)$, to thereby set the detection sensitivity to be high.

Further, for example, the controller 25 may adjust the size of the slope from the slope a (>0) when the voltage rises and the slope −a when the voltage falls to a different size, in the triangular wave signal $V_{in}(t)$ output from the integration circuit 42.

That is, the controller 25 may set the slope when the voltage rises to a, and may set the slope when the voltage falls to −b (b≠a).

Further, for example, the controller 25 may control the waveform generator 41 to change the frequency of the square wave signal $V_0(t)$ output from the waveform generator 41, to thereby adjust the frequency of the triangular wave signal $V_{in}(t)$ output from the integration circuit 42.

Accordingly, for example, the controller 25 may adjust the frequency of the triangular wave signal $V_{in}(t)$ in order to prevent interference due to noise generated from the display section 22 or noise generated from an AC (Alternating Current) adaptor that connects the display apparatus 1 to a commercial alternating current source.

That is, for example, the controller 25 may adjust the frequency of the triangular wave signal $V_{in}(t)$ into a frequency different from the frequency of the noise, to thereby prevent interference due to noise.

In this case, since the waveform of the triangular wave signal $V_{in}(t)$ applied to the transmission electrode $Tx_i$ is not (almost) distorted due to noise, distortion due to noise does not occur in the detection signal $V_{out}(t)$ detected by the signal detecting section 24.

The signal detecting section 24 integrates the alternating current i(t) generated by the application of the triangular wave signal $V_{in}(t)$, to detect the detection signal $V_{out}(t)$. Thus, even though the waveform of the triangular wave signal $V_{in}(t)$ applied to the transmission electrode $Tx_i$ is distorted due to noise, the signal-detecting section 24 may detect a detection signal $V_{out}(t)$ in which distortion due to the noise generated in the triangular wave signal $V_{in}(t)$ is suppressed (smoothed) by the integration.

Further, since if the signal detecting section 24 samples and holds the detected detection signal $V_{out}(t)$ at the frequency different from the frequency of the noise (noise frequency), the signal detecting section 24 may sample and hold a voltage value V while excluding the distorted portion of the detection signal $V_{out}(t)$ in which distortion occurs.

That is, the signal detecting section 24 may obtain the voltage value V as the amplitude of the detection signal $V_{out}(t)$ while excluding the distorted portion of the detection signal $V_{out}(t)$, with relatively high accuracy.

Accordingly, the controller 25 may detect the approach of the finger of the user or the like with high accuracy, on the basis of the amplitude of the detection signal $V_{out}(t)$ detected by the signal detecting section 24, regardless of the noise generated from the display section 22 or the AC adaptor.

The voltage follower circuit 43 in FIG. 5 converts the triangular wave signal $V_{in}(t)$ from the integration circuit 42 into a low output impedance, and applies the result to the transmission electrode $Tx_1$ connected to the voltage follower circuit 43 through the connection terminal 69.

Thus, an alternating current i=i(t) as shown in FIG. 5 is generated in the reception electrode $Rx_1$ by the voltage follower circuit 43. Further, in the reception electrode $Rx_1$, the alternating current i output from the resistor $Rs_1$ is divided, and then, an alternating current ip (p is a value of 0 or more and less than 1) from among the alternating current i is supplied to the capacitor $Cp_1$ and the remaining alternating current i−ip is supplied to the resistor $Rs_2$.

Similarly, the alternating current i−ip output from the resistor $Rs_2$ is divided, and then, an alternating current ip from among the alternating current i−ip is supplied to the capacitor $Cp_2$ and the remaining alternating current i−2ip is supplied to the resistor $Rs_3$.

Similarly, with respect to the resistor $Rs_3$ and the capacitor $Cp_3$ or thereafter, the division of the alternating current is performed. Accordingly, an alternating current i−(x−1)ip is supplied to a resistor Rsx, and an electric current ip is supplied to a capacitor $Cp_x$. In FIG. 5, x=1, 2, . . . , 10.

Thus, an alternating current i−9ip that is supplied to a resistor $Rs_{10}$ from a resistor $Rs_9$ and is output from the resistor $Rs_{10}$ is divided, and then, an alternating current ip from among the alternating current i−9ip is supplied to a capacitor $Cp_{10}$ and a remaining alternating current i−10ip is supplied to the signal detecting section 24.

The signal detecting section 24 mainly includes an integration circuit 81, a sample and hold circuit 82, and an AD conversion circuit 83.

As shown in FIG. 5, the integration circuit 81 is electrically connected to the reception electrode $Rx_1$ through a connection terminal 101, and includes a resistor 102, a capacitor 103 and an operational amplifier 104.

In the integration circuit 81, the resistor 102 and the capacitor 103 are connected in parallel between an inverting input terminal and an output terminal of the operational amplifier 104. The connection terminal 101, in addition to one end of the resistor 102 and one end of the capacitor 103, is connected to the inverting input terminal of the operational amplifier 104. Further, a non-inverting input terminal of the operational amplifier 104 is grounded, and a connection terminal 105, in addition to the other end of the resistor 102 and the other end of the capacitor 103, is connected to the output terminal of the operational amplifier 104.

The integration circuit 81 integrates the current i–10ip supplied from the reception electrode $Rx_1$ through the connection terminal 101 with the time t, to generate the detection signal $V_{out}(t)$ that is indicated by voltage, and supplies the result to the sample and hold circuit 82 through the connection terminal 105.

The sample and hold circuit 82 samples and holds the detection signal $V_{out}(t)$ supplied from the integration circuit 81 through the connection terminal 105 at a predetermined sampling frequency, and supplies a voltage value $V_{max}$ obtained by the sampling and holding to the AD conversion circuit 83.

The AD conversion circuit 83 AD-converts the voltage value $V_{max}$ that is an analog signal, that is supplied from the sample and hold circuit 82, into a voltage value $V_{max}$ that is a digital signal, and then supplies the result to the controller 25.

The controller 25 detects the approach of the finger of the user or the like on the basis of whether the voltage value $V_{max}$ from the AD conversion circuit 83 of the signal detecting section 24 is equal to or less than a predetermined threshold value TH. Further, the controller 25 determines the movement of the finger of the user or the like on the basis of the detection result at each intersection point between the transmission electrode $Tx_1$ to $Tx_N$ and the reception electrodes $Rx_1$ to $Rx_M$, and performs a process based on the determination result.

Figure 7:
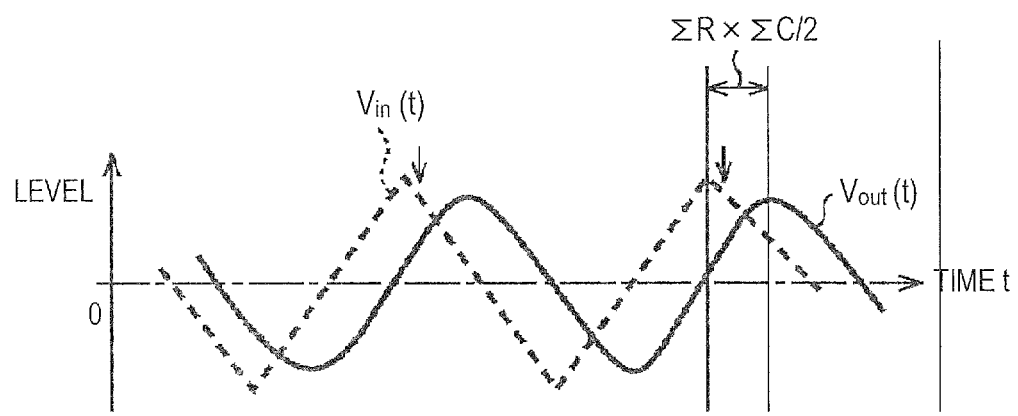
FIG. 7 is a diagram illustrating an example in which the phase of a detection signal is delayed compared with a triangular wave signal due to a time constant of a reception electrode.

Next, FIG. 7 shows an example in which the phase of the detection signal $V_{out}(t)$ is delayed compared with the triangular wave signal $V_{in}(t)$ due to the time constant of the reception electrode Rx, that is, the resistors $Rs_1$ to $Rs_{10}$ or parasitic capacitors $Cp_0$ to $Cp_{10}$ of the reception electrode $Rx_j$.

The delay of the phase of the triangular wave signal $V_{in}(t)$ occurs due to the electrostatic capacitance, parasitic resistance or the like of the capacitor installed in the display section 22, in addition to the resistors $Rs_1$ to $Rs_{10}$ or the parasitic capacitors of the reception electrode $Rx_1$.

In FIG. 7, an example of a state where the phase of the detection signal $V_{out}(t)$ is delayed by about $\Sigma R \times \Sigma C/2$ compared with the triangular wave signal $V_{in}(t)$.

Here, "$\Sigma R$" represents the total sum of the resistance values R of the respective resistors $Rs_1$ to $Rs_{10}$ of the reception electrode $Rx_1$, and "$\Sigma C$" represents the total sum of the electrostatic capacitances C of the respective capacitors $Cp_1$ to $Cp_{10}$.

Further, as shown in FIG. 7, the detection signal $V_{out}(t)$ becomes a waveform that is close to a sine wave due to the time constant of the reception electrode $Rx_1$, that is, the resistors $Rs_1$ to $Rs_{10}$ or the parasitic capacitors $Cp_0$ to $Cp_{10}$ of the reception electrode $Rx_1$. The detection signal $V_{out}(t)$ becomes a waveform that is close to the sine wave as the time constant of the reception electrode $Rx_1$ is large.

The sample and hold circuit 82 samples and holds the detection signal $V_{out}(t)$ applied from the integration circuit 81 through the connection terminal 105 at a predetermined sampling frequency.

That is, for example, the sample and hold circuit 82 samples and holds the detection signal $V_{out}(t)$ at a time indicated by a down arrow (↓) (a point that exceeds the maximum value of the triangular wave signal $V_{in}(t)$), and supplies a voltage value obtained as a result to the AD conversion circuit 83.

As shown in FIG. 7, even in a case where a delay occurs in the phase of the detection signal $V_{out}(t)$, when the amount of delay "$\Sigma R \times \Sigma C/2$" due to the phase is very small, the sample and hold circuit 82 may sample and hold a voltage value V ($\cong V_{max}$) that is close to the voltage value $V_{max}$.

Thus, the controller 25 may detect the approach of the finger of the user or the like with relatively high accuracy, on the basis of whether the voltage value V after AD conversion by the AD conversion circuit 83 is equal to or less than the threshold value TH.

However, in a case where the amount of delay "$\Sigma R \times \Sigma C/2$" is too large to be negligible, in the sample and hold circuit 82, the voltage value V ($<V_{max}$) far from the voltage value $V_{max}$ may be sampled and held.

In this case, the controller 25 may not detect the approach of the finger of the user or the like with high accuracy, on the basis of whether the voltage value V after AD conversion by the AD conversion circuit 83 is equal to or less than the threshold value TH. Even in a case where the amount of delay "$\Sigma R \times \Sigma C/2$" is large, it is preferable to detect the approach of the finger of the user or the like with high accuracy.

Next, with reference to FIGS. 8 and 9, an example of a method of detecting the approach of the finger of the user or the like with high accuracy even in a case where the amount of delay "$\Sigma R \times \Sigma C/2$" is large will be described.

Figure 8:
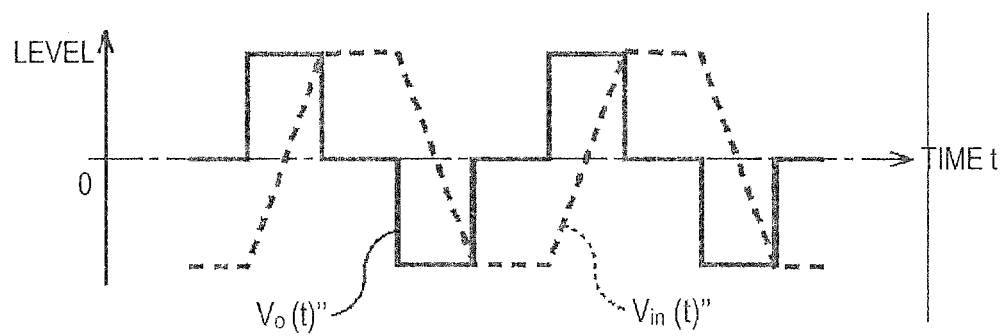
FIG. 8 is a diagram illustrating another example of a process performed by a waveform generating section and an integration circuit.

FIG. 8 shows another example of a process performed by the waveform generator 41 and the integration circuit 42 of the pulse generating section 21.

FIG. 8 shows an example of a square wave signal $V_o(t)"$ having a step-wise waveform generated from the waveform generator 41, and a trapezoidal wave signal $V_{in}(t)"$ generated by integrating the square wave signal $V_o(t)"$.

The waveform generator 41 generates the step-wise square wave signal $V_o(t)"$ as shown in FIG. 8 under the control of the controller 25, and supplies the result to the integration circuit 42 through the connection terminal 61.

As shown in FIG. 8, the integration circuit 42 integrates the square wave signal $V_o(t)"$ supplied from the waveform generator 41 through the connection terminal 61 with the time t, to generate the trapezoidal wave signal $V_{in}(t)"$ that is indicated by voltage, and outputs the result to the voltage follower circuit 43.

The voltage follower circuit 43 impedance-converts the trapezoidal wave signal $V_{in}(t)"$ from the integration circuit 42, and applies the result to the transmission electrode $Tx_1$ connected to the voltage follower circuit 43 through the connection terminal 69.

Thus, in a similar way to a case where the triangular wave signal $V_{in}(t)$ is applied to the transmission electrode $Tx_1$, the alternating currents i–10ip is supplied to the integration circuit 81 of the signal detecting section 24 from the reception electrode $Rx_1$ through the connection terminal 101.

Figure 9:
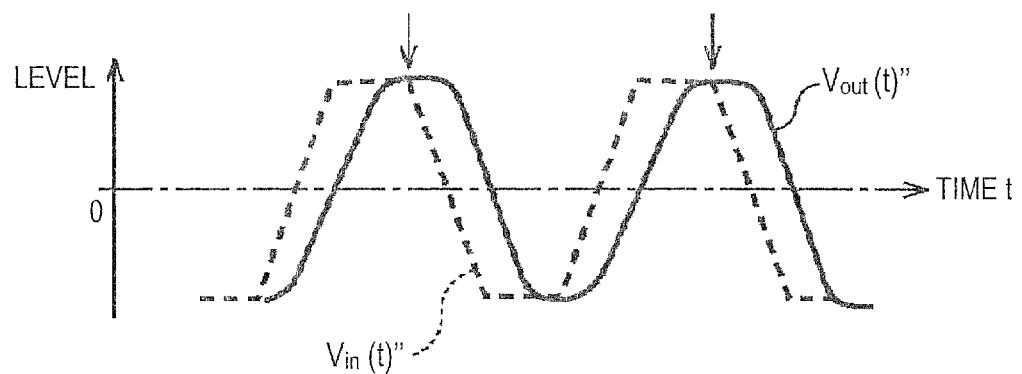
FIG. 9 is a diagram illustrating an example of a process performed by a signal detecting section in a case where a trapezoidal wave signal is applied to a transmission electrode.

Next, FIG. 9 shows an example of a process performed by the signal detecting section 24 in a case where the trapezoidal wave signal $V_{in}(t)"$ is applied to the transmission electrode $Tx_1$.

FIG. 9 shows an example of a detection signal $V_{out}(t)"$ that is delayed by about $\Sigma R \times \Sigma C/2$ compared with the trapezoidal wave signal $V_{in}(t)"$, together with the trapezoidal wave signal $V_{in}(t)"$ applied to the transmission electrode $Tx_1$. The phase of the detection signal $V_{out}(t)"$ is delayed by about $\Sigma R \times \Sigma C/2$ compared with the trapezoidal wave signal $V_{in}(t)"$, in a similar way to the case in FIG. 7. Further, the amplitude of the detection signal $V_{out}(t)"$ is maintained with the same length as that of a period when the amplitude in the trapezoidal wave signal $V_{in}(t)"$ is maintained. That is, the maximum value (or minimum value) of the detection signal $V_{out}(t)"$ is maintained with the same length as that of a period when the maximum value (or minimum value) in the trapezoidal wave signal $V_{in}(t)''$ is maintained.

The integration circuit 81 integrates the alternating current i−10ip supplied from the reception electrode $Rx_1$ through the connection terminal 101 with the time t, to generate the detection signal $V_{out}(t)''$, and supplies the result to the sample and hold circuit 82 through the connection terminal 105.

The sample and hold circuit 82 samples and holds the detection signal $V_{out}(t)''$ applied from the integration circuit 81 through the connection terminal 105 at a predetermined sampling frequency.

That is, for example, the sample and hold circuit 82 samples and holds the detection signal $V_{out}(t)''$ at a time indicated by a down arrow (↓) (right end portion of an upper side of the trapezoidal wave signal $V_{in}(t)''$), and supplies a voltage value obtained as a result to the AD conversion circuit 83, as shown in FIG. 9.

As shown in FIG. 9, even in a case where delay occurs in the phase of the detection signal $V_{out}(t)''$, since the waveform of the detection signal $V_{out}(t)''$ is the trapezoidal waveform, even when the amount of delay "ΣR×ΣC/2" is relatively large, the sample and hold circuit 82 may sample and hold the voltage value $V_{max}$ that is the maximum value of the detection signal $V_{out}(t)''$.

Thus, even in a case where the amount of delay ΣR×ΣC/2 is large, the controller 25 may detect the approach of the finger of the user or the like with relatively high accuracy, on the basis of whether the voltage value $V_{max}$ after AD conversion by the AD conversion circuit 83 is equal to or less than the threshold value TH.

[Description of Operation of Display Apparatus 1]

Next, an example of an operation of a detection process performed by the display apparatus 1 will be described with reference to the flowchart of FIG. 10.

The detection process starts when a vertical blanking period comes, for example. At this time, the controller 25 controls the pulse generating section 21 and the signal detecting section 24 to perform the following process.

That is, in step S21, the controller 25 selects a predetermined transmission electrode $Tx_i$ (i is an integer of 1, 2, . . . , N) from among the plural transmission electrodes $Tx_1$ to $Tx_N$. Further, the controller 25 electrically connects the selected transmission electrode $Tx_i$ from among the plural transmission electrodes $Tx_1$ to $Tx_N$ to the connection terminal 69 of the pulse generating section 21, and sets the remaining transmission electrodes to a fixed voltage. The pulse generating section 21 may ground the remaining transmission electrodes, for example, to achieve the predetermined fixed voltage.

In step S22, the controller 25 selects a predetermined reception electrode $Rx_j$ (j is an integer of 1 to M) from among the plural reception electrodes $Rx_1$ to $Rx_M$. Further, the controller 25 electrically connects the selected reception electrode $Rx_j$ to the connection terminal 101 of the signal detecting section 24.

In step S23, the waveform generator 41 of the pulse generating section 21 generates a square wave signal $V_0(t)$ that is indicated by voltage, for example, under the control of the controller 25, and supplies the result to the integration circuit 42 through the connection terminal 61.

In step S24, the integration circuit 42 integrates the square wave signal $V_0(t)$ supplied from the waveform generator 41 through the connection terminal 61 with the time t under the control of the controller 25, to generate a triangular wave signal $V_{in}(t)$ that is indicated by voltage, and outputs the result to the voltage follower circuit 43.

In step S23, the waveform generator 41 generates a stepwise square wave signal $V_0(t)''$, instead of the square wave signal $V_0(t)$, under the control of the controller 25. Further, in step S24, the integration circuit 42 may integrate the stepwise square wave signal $V_0(t)''$ generated in step S23 with the time t to generate a trapezoidal wave signal $V_{in}(t)''$, and may output the result to the voltage follower circuit 43.

However, hereinafter, it is assumed that the integration circuit 42 outputs the generated triangular wave signal $V_{in}(t)$ to the voltage follower circuit 43.

In step S25, the voltage follower circuit 43 impedance-converts the triangular wave signal $V_{in}(t)$ that is indicated by voltage, from the integration circuit 42, and applies the result to the transmission electrode $Tx_i$ that is connected thereto through the connection terminal 69. Thus, the alternating current i flows in the reception electrode $Rx_j$ from the transmission electrode $Tx_i$ through the capacitor $C_2$ when the finger of the user or the like does not approach, and through the capacitors $C_1$ and $C_2$ that are parallel circuits when the finger of the user or the like approaches.

The alternating current i is supplied to the signal detecting section 24 while being dividedly supplied, by an alternating current ip, to the respective capacitors $Cp_1$ to $Cp_{10}$ that are connected to the reception electrode $Rx_j$. Thus, the alternating current i−10ip is supplied from the reception electrode $Rx_j$ to the integration circuit 81 of the signal detecting section 24 through the connection terminal 101.

In step S26, the integration circuit 81 of the signal detecting section 24 integrates the electric current i−10ip supplied from the reception electrode $Rx_j$ through the connection terminal 101 with the time t to generate the detection signal $V_{out}(t)$ that is indicated by voltage, and applies the result to the sample and hold circuit 82 through the connection terminal 105.

In step S27, the sample and hold circuit 82 samples and holds the detection signal $V_{out}(t)$ applied from the integration circuit 81 through the connection terminal 105 at a predetermined sampling frequency, and supplies a voltage value obtained by the sampling and holding to the AD conversion circuit 83.

In step S28, the AD conversion circuit 83 performs AD conversion that converts the voltage value that is an analog signal from the sample and hold circuit 82 into the voltage value that is a digital signal, and supplies the voltage value after AD conversion to the controller 25.

In step S29, the controller 25 detects the approach of the user at the intersection point between the transmission electrode $Tx_i$ and the reception electrode $Rx_j$, on the basis of whether the voltage value from the AD conversion circuit 83 is equal to or less than a predetermined threshold value TH.

In step S30, the controller 25 determines whether all of the plural reception electrodes $Rx_1$ to $Rx_M$ are selected. In a case where it is determined that all of the plural reception electrodes $Rx_1$ to $Rx_M$ are not selected, the procedure returns to step S22.

In step S22, the controller 25 newly selects the reception electrode $Rx_j$ that is not yet selected from among the plural reception electrodes $Rx_1$ to $Rx_M$. Further, the controller 25 electrically connects the newly selected reception electrode $Rx_j$ from among the plural reception electrodes $Rx_1$ to $Rx_M$ to the connection terminal 101 of the signal detecting section 24, and the procedure goes to step S23. Then, the same process is performed.

Further, in step S30, in a case where the controller 25 determines that all of the plural reception electrodes $Rx_1$ to $Rx_M$ are selected, the procedure goes to step S31. In step S31, the controller 25 determines whether all of the plural transmission electrodes $Tx_1$ to $Tx_N$ are selected, and in a case where the controller 25 determines that all of the plural transmission electrodes $Tx_1$ to $Tx_N$ are not selected, the procedure returns to step S21.

In step S21, the controller 25 newly selects the transmission electrode $Tx_i$ that is not yet selected from among the plural transmission electrodes $Tx_1$ to $Tx_N$. Further, the controller 25 electrically connects the newly selected transmission electrode $Tx_i$ from among the plural transmission electrodes $Tx_1$ to $Tx_N$ to the connection terminal 69 of the pulse generating section 21 and grounds the remaining transmission electrodes, for example, to a predetermined fixed voltage, and then, the procedure goes to step S22. Then, the same process is performed.

Further, in step S31, in a case where the controller 25 determines that all of the plural transmission electrodes $Tx_1$ to $Tx_N$ are selected, the procedure goes to step S32. In step S32, the controller 25 determines the movement of the finger of the user or the like, on the basis of the detection result at each intersection point between the transmission electrodes $Tx_i$ to $Tx_N$ and the reception electrodes $Rx_1$ to $Rx_M$, and performs a process based on the determination result. That is, for example, the controller 25 changes the display content or the like of the display section 22 on the basis of the determination result. Hence, the detection process of FIG. 10 ends.

As described above, according to the detection process of FIG. 10, the pulse generating section 21 applies the triangular wave signal $V_{in}(t)$ or the trapezoidal wave signal $V_{in}(t)''$ to the transmission electrode $Tx_i$, for example. Thus, it is possible to perform detection in a short time regardless of wiring resistance of the reception electrode $Rx_j$, and to increase the number of detections for a predetermined time.

Accordingly, for example, since the frame rate of the image displayed on the display section 22 is high, even in a case where the period when the detection of the finger of the user or the like is performed (for example, vertical blanking period) is short, it is possible to detect the approach of the finger of the user or the like with high accuracy.

Figure 10:
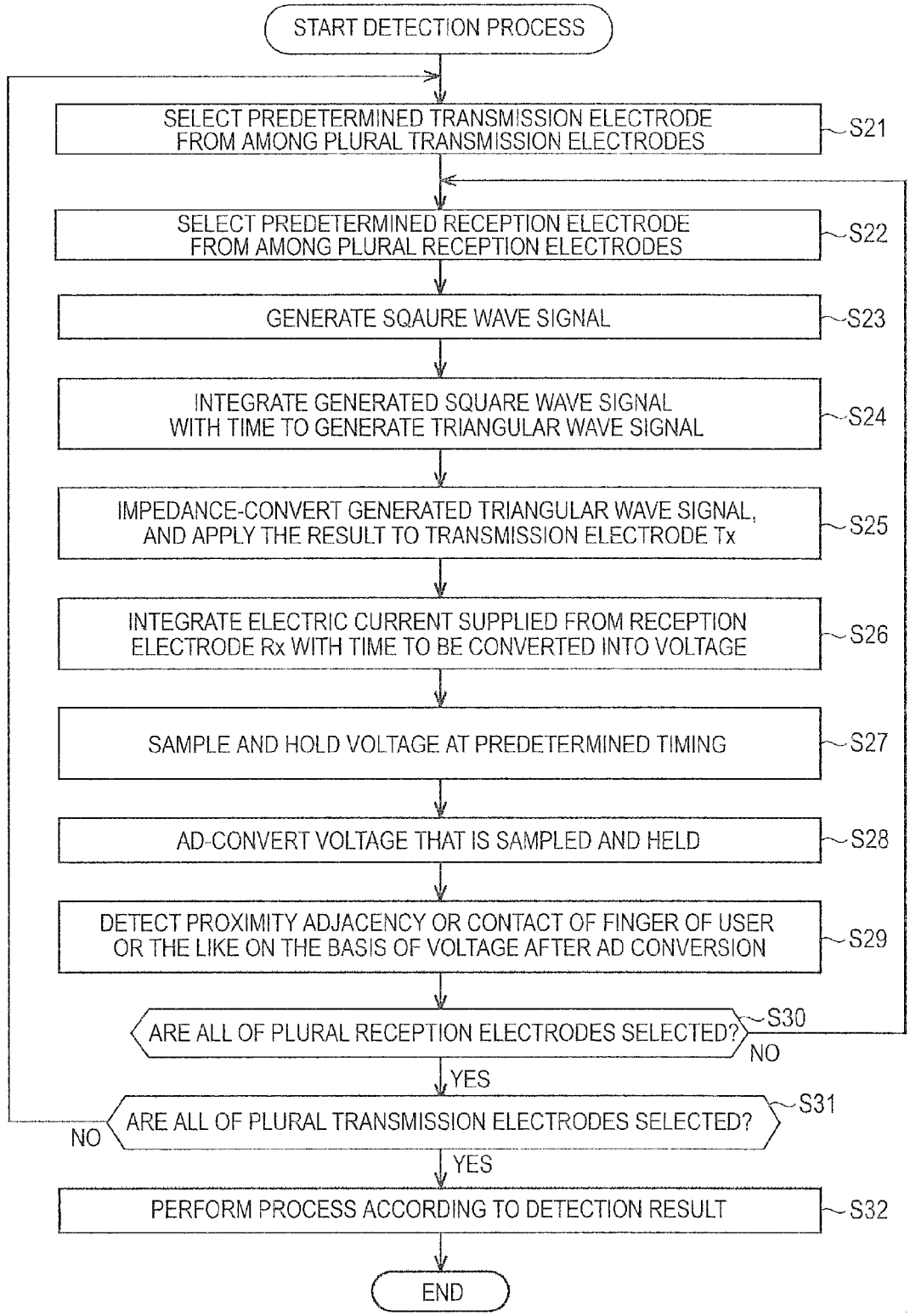
FIG. 10 is a flowchart illustrating a detection process performed by the display apparatus in FIG. 1.

Further, according to the detection process of FIG. 10, it is possible to perform detection in a short time, regardless of resistance (particularly, wiring resistance of the reception electrode $Rx_j$) or the like due to wiring or the like of the display apparatus 1 that is integrally formed with the touch panel 23, and to increase the number of detections for a predetermined time. Accordingly, it is possible to apply the present technique to a large display or the like in which a large number of long wirings and the like are necessary.

Further, according to the detection process of FIG. 10, compared with the square wave signal $V_{in}(t)'$, the triangular wave signal $V_{in}(t)$ or the trapezoidal wave signal $V_{in}(t)''$ having a small harmonic content at a low voltage is applied to the transmission electrode $Tx_i$. Thus, in the display apparatus 1, it is possible to prevent electro magnetic interference (EMI) from occurring due to high voltage or harmonic waves.

Further, since the triangular wave signal $V_{in}(t)$ or the trapezoidal wave signal $V_{in}(t)''$ is a low voltage compared with the square wave signal $V_{in}(t)'$, it is possible to perform the detection of the approach of the finger of the user or the like with low power consumption, compared with a case where the square wave signal $V_{in}(t)'$ is applied to the transmission electrode $Tx_i$.

However, in the first embodiment, the controller 25 causes the pulse generating section 21 to individually select the reception electrodes $Rx_j$ one by one. However, the controller 25 may cause the pulse generating section 21 to simultaneously select plural or all of the reception electrodes $Rx_j$ according to the processing circuit of the signal detecting section 24. Thus, it is possible to reduce the detection time when the approach of the finger of the user or the like is detected, which is particularly efficient when a high-definition image is displayed on the display section 22.

Further, in the first embodiment, the integration circuit 81 of the signal detecting section 24 integrates the electric current i–10ip supplied from the reception electrode $Rx_j$ through the connection terminal 101 with the time t, for example, to generate the detection signal $V_{out}(t)$. However, the method of generating the detection signal $V_{out}(t)$ is not limited thereto.

That is, for example, the detection signal $V_{out}(t)$ that is indicated by voltage may be directly detected using the voltage follower circuit or the like, for example.

2. Second Embodiment

[Example in which Voltage Follower Circuit is Used]

Figure 11:
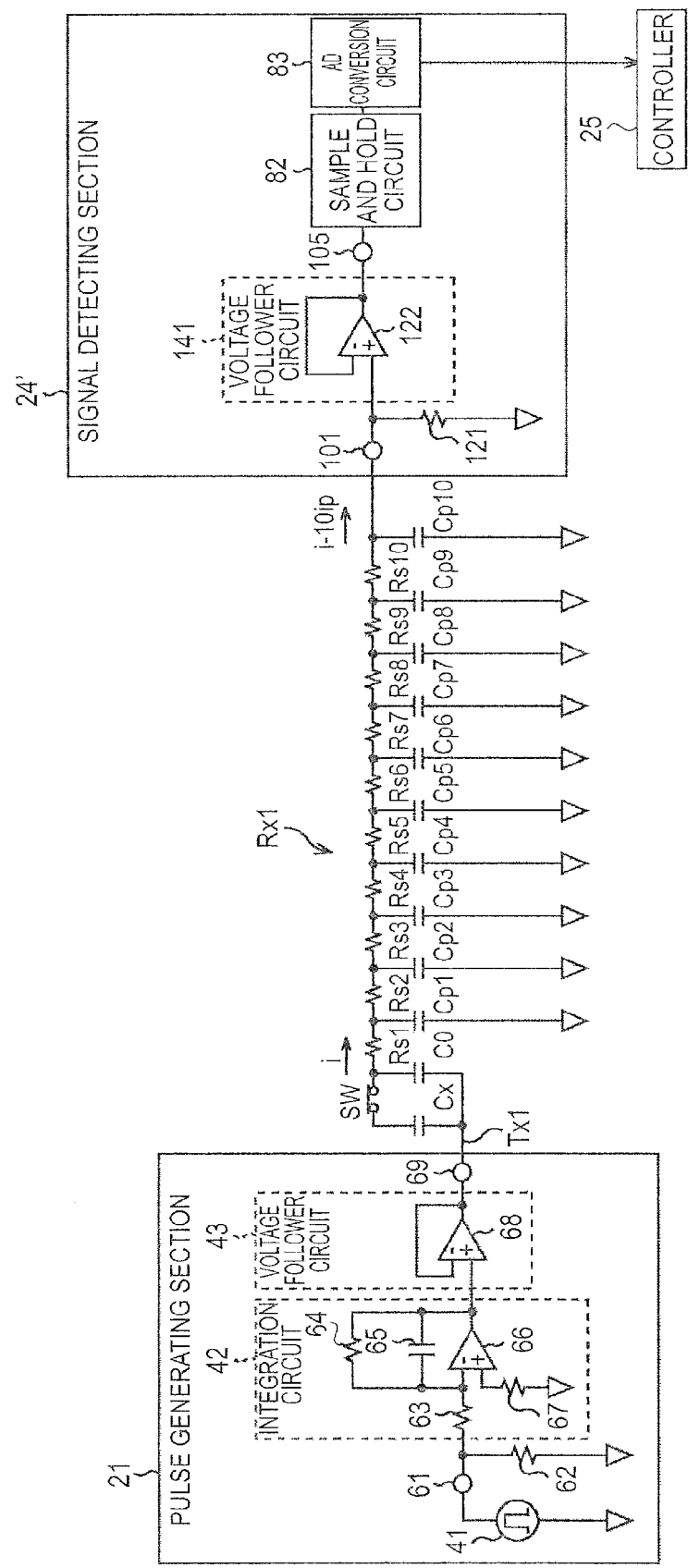
FIG. 11 is a block diagram illustrating an example in which a detection signal is directly detected using a signal detecting section in which a voltage follower circuit and the like are installed.

Next, FIG. 11 shows an example in which a detection signal $V_{out}(t)$ is directly detected using a signal detecting section 24' in which a voltage follower circuit and the like are installed, instead of the signal detecting section 24.

In FIG. 11, the same configuration as that of FIG. 5 is used, except that the signal detecting section 24' is installed instead of the signal detecting section 24 in FIG. 5.

Further, in the signal detecting section 24' in FIG. 11, since the same reference numerals are given to the same components as those of the signal detecting section 24 in FIG. 5, description thereof will be appropriately omitted.

That is, in the signal detecting section 24' in FIG. 11, the same configuration as that of FIG. 5 is used, except that a resistor 121 and an operational amplifier 122 are installed instead of the integration circuit 81 in FIG. 5.

The resistor 121 is grounded at one end thereof, and is connected to a non-inverting input terminal of the operational amplifier 122 at the other end thereof. Further, the resistor 121 is connected in series to the reception electrode $Rx_1$.

The operational amplifier 122 has an output terminal that is connected to the non-inverting input terminal thereof, and functions as a voltage follower circuit 141. Further, the output terminal of the operational amplifier 122 is also connected to the connection terminal 105.

That is, the operational amplifier 122 that is the voltage follower circuit 141 detects voltage generated in the resistor 121 as the detection signal $V_{out}(t)$, on the basis of the alternating current i–10ip supplied from the reception electrode $Rx_1$ through the connection terminal 101. Further, the operational amplifier 122 applies the detected detection signal $V_{out}(t)$ to the sample and hold circuit 82 through the connection terminal 105.

Further, since the operational amplifier 122 that is the voltage follower circuit 141 has a high input impedance and a low output impedance, the operational amplifier 122 may be used as an impedance converter.

3. Third Embodiment

[Example in which Current Mirror Circuit is Used]

Figure 12:
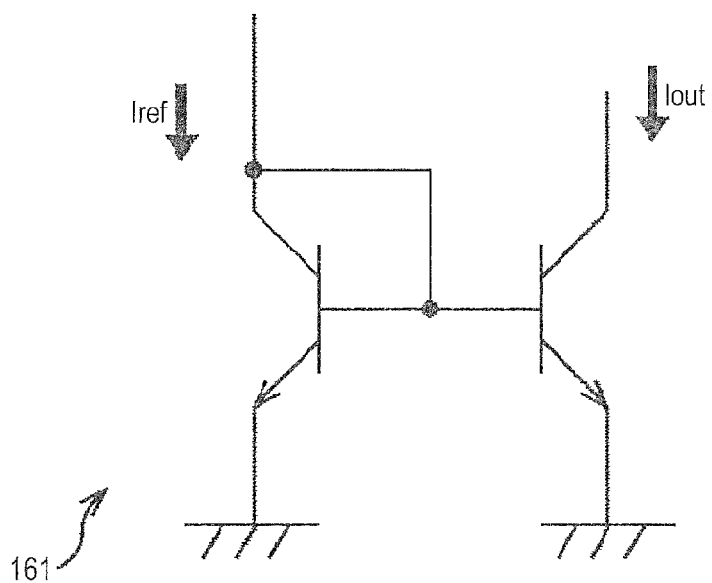
FIG. 12 is a diagram illustrating a configuration example of a current mirror circuit.

Further, for example, a current mirror circuit 161 as shown in FIG. 12 may be installed instead of the integration circuit 81 of the signal detecting section 24. In this case, the current mirror circuit 161 detects the detection signal $V_{out}(t)$, and supplies the result to the sample and hold circuit 82 through the connection terminal 105.

That is, for example, the alternating current i–10ip is supplied to the current mirror circuit 161 from the reception electrode $Rx_1$ through the connection terminal 101 as an alternating current $I_{ref}$ shown in FIG. 12. The current mirror circuit 161 generates an alternating current $I_{out}$ having the same size that of the alternating current $I_{ref}$, on the basis of the alternating current $I_{ref}$ supplied thereto, and supplies the result to a resistor (not shown) having a known resistance value R[Ω], for example. Thus, it is possible to calculate (detect) a multiplication result R×$I_{out}$ of the resistance value R and the alternating current $I_{out}$ (=$I_{ref}$) as a detection signal $V_{out}(t)$ that is a voltage generated in the resistor (not shown). In the current mirror circuit 161, the calculation of the detection signal $V_{out}(t)$ is performed by a calculation circuit (not shown).

In the current mirror circuit 161, a bias current necessary for generating the alternating current $I_{out}$ having the same size as that of the alternating current $I_{ref}$ supplied from the reception electrode $Rx_j$ through the connection terminal 101 is increased to several tens of mA, thereby causing an increase in power consumption.

Thus, it is preferable to use the integration circuit 81 (FIG. 5) or the voltage follower circuit 141 (FIG. 11), having relatively low power consumption, for detection of the detection signal $V_{out}(t)$.

[Actual Measurement Result]

Next, FIGS. 13A to 17D show actual measurement results.

FIGS. 13A to 13D show measurement results measured by the respective circuits shown in FIG. 5.

Figure 13A:
FIGS. 13A to 13D are diagrams illustrating measurement results measured by the respective circuits shown in FIG. 5.

FIG. 13A shows a measurement result of the square wave signal $V_0(t)$ generated from the waveform generator 41 of the pulse generating section 21.

Figure 13B:

FIG. 13B shows a measurement result of the triangular wave signal $V_{in}(t)$ generated by the integration circuit 42 of the pulse generating section 21. The waveform of the triangular wave signal $V_{in}(t)$ shown in FIG. 13B is reversed to the triangular wave signal $V_{in}(t)$ shown in FIG. 6. This is based on the fact that a negative value of an integration result obtained by integrating the square wave signal $V_0(t)$ with the time t is actually output in the integration circuit 42. This is similarly applied to the figures of FIGS. 14A to 14D or thereafter.

Figure 13C:
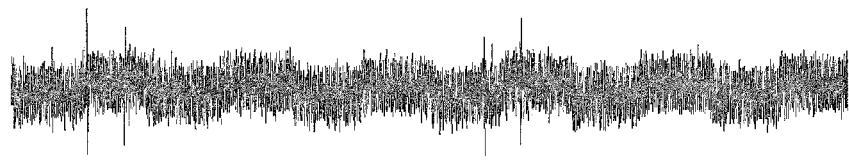

FIG. 13C shows a measurement result of the alternating current i flowing in the reception electrode $Rx_1$.

Figure 13D:
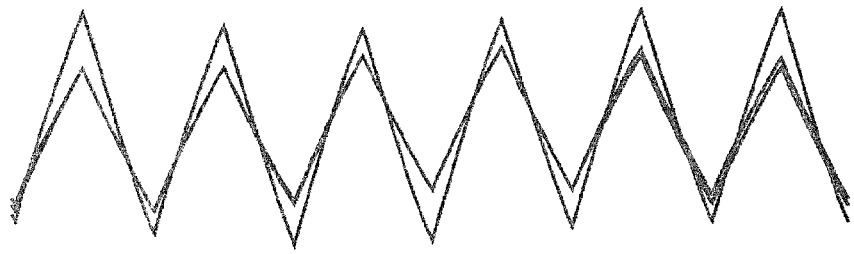

FIG. 13D shows a measurement result of the detection signal $V_{out}(t)$ generated by the integration circuit 81 of the signal detecting section 24. In FIG. 13D, the detection signal $V_{out}(t)$ having a large amplitude represents a detection signal when the approach of the finger of the user or the like is not present, and the detection signal $V_{out}(t)$ having a small amplitude represents a detection signal when the approach of the finger of the user or the like is present.

As shown in FIG. 13D, as the finger of the user or the like approaches, the amplitude of the detection signal $V_{out}(t)$ becomes small.

FIGS. 14A to 14D show measurement results measured from the respective circuits shown in FIG. 11.

Figure 14A:
FIGS. 14A to 14D are diagrams illustrating measurement results measured by the respective circuits shown in FIG. 11.
Figure 14B:
Figure 14C:

FIG. 14A shows a measurement result of the square wave signal $V_0(t)$ generated from the waveform generator 41 of the pulse generating section 21. FIG. 14B shows a measurement result of the triangular wave signal $V_{in}(t)$ generated by the integration circuit 42 of the pulse generating section 21. FIG. 14C shows a measurement result of the triangular wave signal $V_{in}(t)$ that is the voltage applied to the resistor 121 of the signal detecting section 24' from the reception electrode $Rx_1$.

Figure 14D:

FIG. 14D shows a measurement result of the detection signal $V_{out}(t)$ detected by the voltage follower circuit 141 of the signal detecting section 24'. In FIG. 14D, the detection signal $V_{out}(t)$ having a large amplitude represents a detection signal when the approach of the finger of the user or the like is not present, and the detection signal $V_{out}(t)$ having a small amplitude represents a detection signal when the approach of the finger of the user or the like is present.

As shown in FIG. 14D, as the finger of the user or the like approaches, the amplitude of the detection signal $V_{out}(t)$ becomes small.

Figure 15A:
FIGS. 15A to 15C are diagrams illustrating an example of a state where the phase of a detection signal is delayed according to a time constant of a reception electrode.
Figure 15B:
Figure 15C:
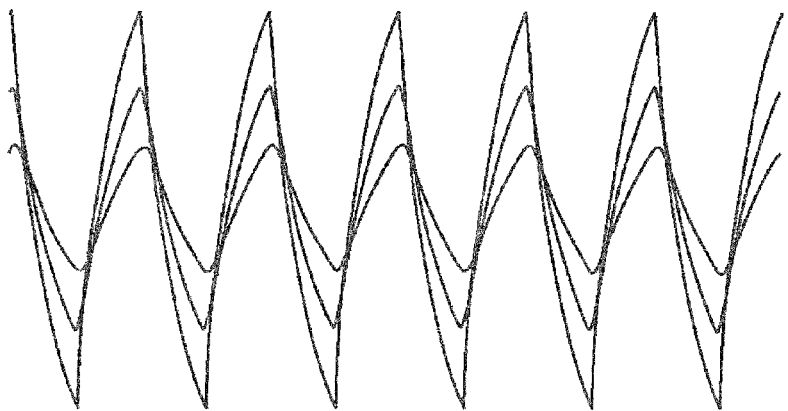

Next, FIGS. 15A to 15C show an example of a state where the phase of the detection signal $V_{out}(t)$ is delayed according to the time constant of the reception electrode $Rx_1$.

FIG. 15A shows a measurement result of the square wave signal $V_0(t)$ generated from the waveform generator 41 of the pulse generating section 21. FIG. 15B shows a measurement result of the triangular wave signal $V_{in}(t)$ generated by the integration circuit 42 of the pulse generating section 21.

In FIG. 15C, a waveform having the largest amplitude represents the waveform of voltage at a connection point between the switch SW and the resistor $Rs_1$ in FIG. 5, and a waveform having the second largest amplitude represents the waveform of voltage at a connection point between the resistor $Rs_6$ and the resistor $Rs_7$ in FIG. 5.

Further, in FIG. 15C, a waveform having the third largest amplitude represents the waveform of voltage (voltage applied to the resistor 121) at a connection point between the resistor $Rs_{10}$ and the connection terminal 101 in FIG. 5.

As shown in FIG. 15C, it can be understood that the amplitude of the voltage detected as the detection signal $V_{out}(t)$ is decreased according to the time constant (distribution constant) of the reception electrode $Rx_1$ and the phase of the voltage is delayed.

Next, FIGS. 16A to 16D show measurement results measured from the respective circuits shown in FIG. 5, when the resistance component of the reception electrode $Rx_1$ in FIG. 5 is increased.

Figure 16A:
FIGS. 16A to 16D are diagrams illustrating measurement results measured by the respective circuits shown in FIG. 5 when a resistance component of the reception electrode in FIG. 5 is increased.
Figure 16B:
Figure 16C:
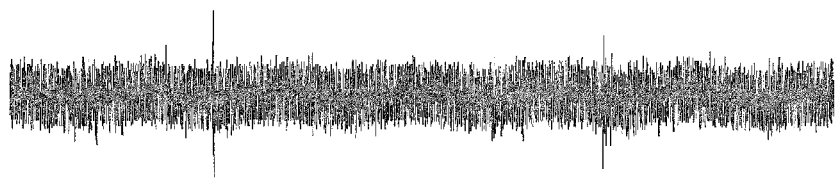

FIG. 16A shows a measurement result of the square wave signal $V_0(t)$ generated from the waveform generator 41 of the pulse generating section 21. FIG. 16B shows a measurement result of the triangular wave signal $V_{in}(t)$ generated by the integration circuit 42 of the pulse generating section 21. FIG. 16C shows a measurement result of the alternating current i generated in the reception electrode $Rx_1$.

Figure 16D:
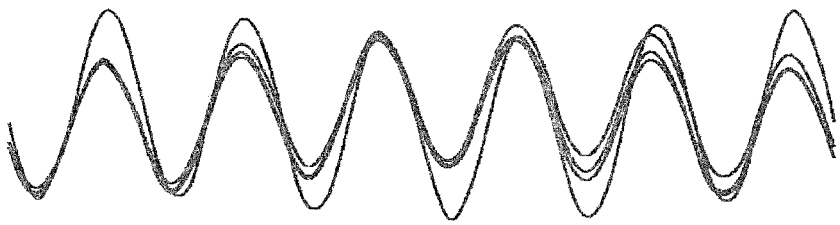

FIG. 16D shows the detection signal $V_{out}(t)$ output from the integration circuit 81 of the signal detecting section 24. In FIG. 16D, as the detection signal $V_{out}(t)$, the presence of plural waveforms is caused by vibration due to peripheral noise. In this regard, in FIG. 5, it is possible to suppress vibration of the detection signal $V_{out}(t)$ by performing resetting (not shown) for discharging the capacitor 103 of the integration circuit 81 into 0V after sampling and holding in the sample and hold circuit 82.

Thus, the sample and hold circuit 82 may sample and hold a voltage value indicating the amplitude of the detection signal $V_{out}(t)$ with accuracy, compared with a case where vibration of the detection signal $V_{out}(t)$ is not suppressed. Accordingly, the controller 25 can detect the approach of the finger of the user or the like with high accuracy, on the basis of the voltage value after sampling and holding and AD conversion.

Further, for example, in a case where the time constant of the reception electrode $Rx_1$ is also large since the resistance component of the reception electrode $Rx_1$ is large, the detection signal $V_{out}(t)$ output from the integration circuit 81 in FIG. 5 becomes a waveform close to a sine wave, as shown in FIG. 16D.

Next, FIGS. 17A to 17D show measurement results measured by the respective circuits shown in FIG. 11 when the resistance component of the reception electrode $Rx_1$ in FIG. 11 is increased.

Figure 17A:
FIGS. 17A to 17D are diagrams illustrating measurement results measured by the respective circuits shown in FIG. 11 when a resistance component of the reception electrode in FIG. 11 is increased.
Figure 17B:

FIG. 17A shows a measurement result of the square wave signal $V_0(t)$ generated from the waveform generator 41 of the pulse generating section 21. FIG. 17B shows a measurement result of the triangular wave signal $V_{in}(t)$ generated by the integration circuit 42 of the pulse generating section 21.

Figure 17C:

FIG. 17C shows a measurement result of voltage applied to the resistor 121 of the signal detecting section 24' from the reception electrode $Rx_1$ through the connection terminal 101. Among the plural waveforms, a waveform having the largest amplitude represents voltage when the finger of the user or the like does not approach, and the other waveforms represent voltage when the finger of the user or the like approaches.

Figure 17D:

FIG. 17D shows the detection voltage $V_{out}(t)$ output from the voltage follower circuit 141 of the signal detecting section 24'. That is, in FIG. 17D, among the plural waveforms, a waveform having the largest amplitude represents the detection signal $V_{out}(t)$ when the finger of the user or the like does not approach, and the other waveforms represent the detection signal $V_{out}(t)$ when the finger of the user or the like approaches.

For example, in a case where the time constant of the reception electrode $Rx_1$ is also large since the resistance component of the reception electrode $Rx_1$ is large, as shown in FIG. 17D, the detection signal $V_{out}(t)$ output from the voltage follower circuit 141 in FIG. 11 also becomes a waveform close to a sine wave.

4. Modification Example

In the first embodiment, the controller 25 detects the approach of the finger of the user or the like, on the basis of whether the voltage value from the signal detecting section 24 is equal to or less than the threshold value TH. However, in the signal detecting section 24, a comparator may be installed instead of the sample and hold circuit 82, and the approach of the finger of the user or the like may be detected on the basis of an output from the comparator.

The comparator compares the voltage value of the detection signal $V_{out}(t)$ supplied from the integration circuit 81 in FIG. 5 with a predetermined comparison value. Further, on the basis of the comparison result, in a case where the voltage value of the detection signal $V_{out}(t)$ is equal to or more than the comparison value, the comparator outputs a High signal and in a case where the voltage value of the detection signal $V_{out}(t)$ is lower than the comparison value, the comparator outputs a Low signal.

Further, in the first embodiment, the integration circuit 42 may generate the trapezoidal wave signal $V_{in}(t)''$ as shown in FIG. 8, but for example, the integration circuit 42 may generate a trapezoidal wave signal $V_{in}(t)'''$ in which the level of the signal (voltage value) falls and the period, when the voltage value after falling is maintained as it is, is omitted in the trapezoidal wave signal $V_{in}(t)''$.

That is, the integration circuit 42 may generate the trapezoidal wave signal $V_{in}(t)'''$ that rises with the first slope a', maintains the voltage value after rising for a predetermined period, falls with the second slope −a', rises again with the first slope a' from the voltage value after falling, and then varies in voltage value in a similar way.

Further, for example, the integration circuit 42 may generate the trapezoidal wave signal $V_{in}(t)''''$ that falls with the second slope −a', maintains the voltage value after falling for a predetermined period, rises with the first slope a', falls again with the second slope −a' from the voltage value after rising, and then varies in voltage value in a similar way.

In this case, the sample and hold circuit 82 samples and holds a minimum value in which the amplitude is maintained for the predetermined period, from among a detection signal $V_{out}(t)''''$ having the same waveform as that of the trapezoidal wave signal $V_{in}(t)''''$, as a voltage value V (<0), and supplies the result to the AD conversion circuit 83.

The AD conversion circuit 83 AD-converts the voltage value V from the sample and hold circuit 82, and supplies the result to the controller 25. The controller 25 detects the approach of the finger of the user or the like on the basis of whether a multiplication result −v (>0) obtained by multiplying the voltage value V from the AD conversion circuit 83 by −1 is equal to or less than the threshold value TH or whether the voltage value V is equal to or more than a threshold value −TH, for example.

Here, the present technique may have the following configurations.

(1) A detection device that detects the approach of a conductor, including: a sensor section that includes a transmission electrode and a reception electrode that is disposed to intersect with the transmission electrode, and detects the approach of the conductor to an intersection point where the transmission electrode and the reception electrode intersect with each other; a voltage generating section that generates an alternating voltage in which a rise of a voltage value according to a first slope and a fall of the voltage value according to a second slope different from the first slope are alternately repeated; a current generating section that applies the alternating voltage to the transmission electrode to generate, in the reception electrode, an alternating current that has a uniform current value according to the first slope while the voltage value of the alternating voltage is rising and a uniform current value according to the second slope while the voltage value of the alternating voltage is falling; a signal generating section that generates a detection signal that vibrates with an amplitude according to a distance between the intersection point and the conductor on the basis of the alternating current generated in the reception electrode; and a detecting section that detects the approach of the conductor to the intersection point on the basis of the amplitude of the detection signal.

(2) The detection device according to (1), wherein the voltage generating section generates the alternating voltage in which at least one of the voltage values after the rise with the first slope and the voltage value after the fall with the second slope is maintained for a predetermined period, and wherein the signal generating section generates the detection signal in which the amplitude is maintained for the predetermined period, on the basis of the alternating current.

(3) The detection device according to (1) or (2), wherein the signal generating section generates the detection signal obtained by integrating the alternating current generated in the reception electrode, and wherein the detecting section detects the approach of the conductor on the basis of comparison of the amplitude of the detection signal with a predetermined threshold value.

(4) The detection device according to any one of (1) to (3), further including: a waveform generating section that generates a square wave signal formed of square waves, wherein the voltage generating section generates the alternating voltage by integrating the square wave signal generated in the waveform generating section.

(5) The detection device according to (4), further including: a controller that controls the waveform generating section to change the amplitude of the square waves that form the square wave signal, so as to adjust at least one of the first slope and the second slope.

(6) The detection device according to any one of (1) to (5), wherein the voltage generating section generates the alternating voltage having a frequency different from a frequency of noise occurring from the outside.

(7) The detection device according to any one of (1) to (6), wherein the transmission electrode and the reception electrode are installed in a display section that displays an image.

(8) The detection device according to (1) or (2), wherein the signal generating section generates voltage generated in a resistor that is connected in series to the reception electrode as the detection signal on the basis of the alternating current from the reception electrode.

(9) The detection device according to (1) or (2), wherein the signal generating section supplies a different alternating current having the same size as the alternating current to a resistor to generate voltage generated in the resistor as the detection signal using a resistance value of the resistor and a current value of the different alternating current, on the basis of the alternating current from the reception electrode.

(10) A detection method using a detection device that detects the approach of a conductor, the detection device including a sensor section that includes a transmission electrode and a reception electrode that is disposed to intersect with the transmission electrode, and detects the approach of the conductor to an intersection point where the transmission electrode and the reception electrode intersect with each other, the method including: generating an alternating voltage in which a rise of a voltage value according to a first slope and a fall of the voltage value according to a second slope different from the first slope are alternately repeated, by the detection device; applying the alternating voltage to the transmission electrode to generate, in the reception electrode, an alternating current that has a uniform current value according to the first slope while the voltage value of the alternating voltage is rising and a uniform current value according to the second slope while the voltage value of the alternating voltage is falling, by the detection device; generating a detection signal that vibrates with an amplitude according to a distance between the intersection point and the conductor on the basis of the alternating current generated in the reception electrode, by the detection device; and detecting the approach of the conductor to the intersection point on the basis of the amplitude of the detection signal, by the detection device.

(11) A program that causes a computer of a detection device that detects the approach of a conductor, including a sensor section that includes a transmission electrode and a reception electrode that is disposed to intersect with the transmission electrode and detects the approach of the conductor to an intersection point where the transmission electrode and the reception electrode intersect with each other, to function as: a voltage generating section that generates an alternating voltage in which a rise of a voltage value according to a first slope and a fall of the voltage value according to a second slope different from the first slope are alternately repeated; a current generating section that applies the alternating voltage to the transmission electrode to generate, in the reception electrode, an alternating current that has a uniform current value according to the first slope while the voltage value of the alternating voltage is rising and a uniform current value according to the second slope while the voltage value of the alternating voltage is falling; a signal generating section that generates a detection signal that vibrates with an amplitude according to a distance between the intersection point and the conductor on the basis of the alternating current generated in the reception electrode; and a detecting section that detects the approach of the conductor to the intersection point on the basis of the amplitude of the detection signal.

(12) A display apparatus that detects the approach of a conductor to a display section, including: a sensor section that includes a transmission electrode and a reception electrode that is disposed to intersect with the transmission electrode, and detects the approach of the conductor to an intersection point where the transmission electrode and the reception electrode intersect with each other; a voltage generating section that generates an alternating voltage in which a rise of a voltage value according to a first slope and a fall of the voltage value according to a second slope different from the first slope are alternately repeated; a current generating section that applies the alternating voltage to the transmission electrode to generate, in the reception electrode, an alternating current that has a uniform current value according to the first slope while the voltage value of the alternating voltage is rising and a uniform current value according to the second slope while the voltage value of the alternating voltage is falling; a signal generating section that generates a detection signal that vibrates with an amplitude according to a distance between the intersection point and the conductor on the basis of the alternating current generated in the reception electrode; a detecting section that detects the approach of the conductor to the intersection point on the basis of the amplitude of the detection signal; and the display section that is integrally formed with the sensor section and displays an image.

The series of processes described above may be performed by hardware, for example, or may be performed by software. In a case where the series of processes are performed by software, a program that forms the software is installed, for example, to a general-purpose computer from a program recording medium. In this case, the computer may be assembled from exclusive hardware and may be installed with various programs to perform various functions.

[Configuration Example of Computer]

Figure 18:
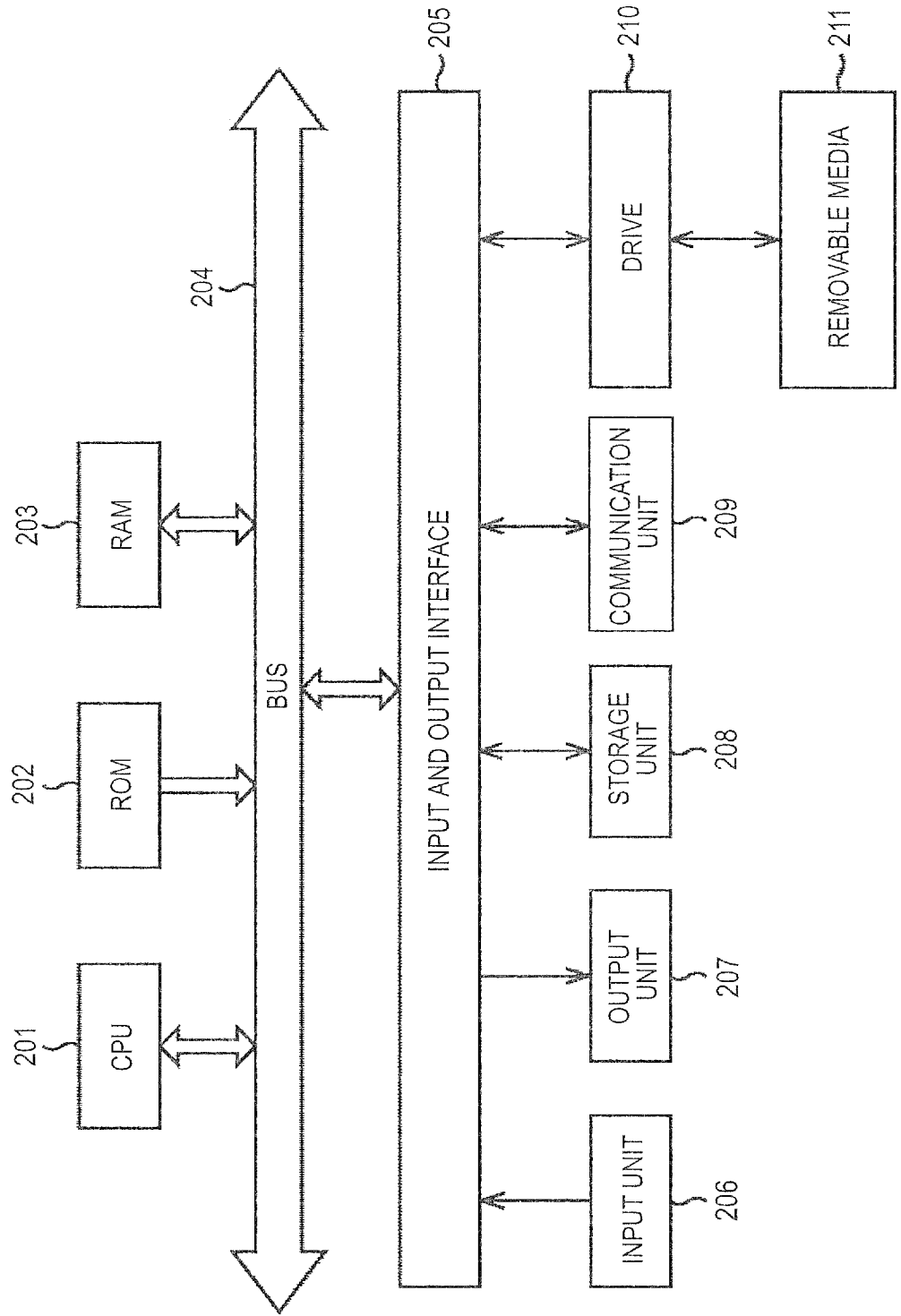
FIG. 18 is a block diagram illustrating a configuration example of a computer.

FIG. 18 shows a configuration example of hardware of the controller 25 that is a computer that executes the series of processes described above by a program.

A CPU (Central Processing Unit) 201 executes various processes according to a program stored in a ROM (Read Only Memory) 202 or a storage unit 208. A program, data or the like to be executed by the CPU 201 are appropriately stored in a RAM (Random Access Memory) 203. The CPU 201, the ROM 202 and the RAM 203 are connected to each other through a bus 204.

Further, an input and output interface 205 is also connected to the CPU 201 through the bus 204. An input unit 206 that includes a keyboard, a mouse, a microphone and the like, and an output unit 207 that includes a display, a speaker and the like are connected to the input and output interface 205. The CPU 201 executes various processes corresponding to commands input from the input unit 206. Further, the CPU 201 outputs the processing result to the output unit 207.

The storage unit 208 connected to the input and output interface 205 includes a hard disk, for example, and stores the program or various data executed by the CPU 201. A communication unit 209 communicates with an external device through a network such as the internet or a local area network.

Further, a program may be obtained through the communication unit 209 and may be stored in the storage unit 208.

A drive 210 connected to the input and output interface 205 drives, when a removable media 211 such as a magnetic disk, an optical disc, a magneto-optical disc or a semiconductor memory is mounted, the removable media 211, and obtains a program, data or the like recorded thereon. The obtained program or data is transmitted to the storage unit 208 for storage as necessary.

As shown in FIG. 18, a recording medium that records (stores) a program that is installed in a computer and is executable by the computer is configured by the removable media 211 that is a package media that includes a magnetic disk (including a flexible disk), an optical disc (including a CD-ROM (Compact Disc-Read Only Memory), a DVD (Digital Versatile Disc)), a magneto-optical disc (MD (Mini-Disc)), a semiconductor memory or the like; the ROM 202 in which a program is temporarily or permanently stored; a hard disk that forms the storage unit 208; and the like. The recording of the program onto the recording medium is performed using a wired or wireless communication medium such as a local area network, the internet, digital satellite broadcasting, through the communication unit 209 that is an interface such as a router or a modem as necessary.

In the present specification, the steps of describing the series of processes described above may include processes that are performed in a time series manner according to the described order, and processes that are executed in parallel or individually, although not necessarily performed in a time series manner.

Further, the present disclosure is not limited to the above-described embodiments, and various modifications may be made in a range without departing from the spirit of the present disclosure.

The present disclosure contains subject matter related to that disclosed in Japanese Priority Patent Application JP 2012-067534 filed in the Japan Patent Office on Mar. 23, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A detection device that detects the approach of a conductor, comprising:
   a sensor section that includes a transmission electrode and a reception electrode that is disposed to intersect with the transmission electrode, and detects the approach of the conductor to an intersection point where the transmission electrode and the reception electrode intersect with each other;
   a voltage generating section that generates an alternating voltage in which a rise of a voltage value according to a first slope and a fall of the voltage value according to a second slope different from the first slope are alternately repeated;
   a current generating section that applies the alternating voltage to the transmission electrode to generate, in the reception electrode, an alternating current that has a uniform current value according to the first slope while the voltage value of the alternating voltage is rising and a uniform current value according to the second slope while the voltage value of the alternating voltage is falling;
   a signal generating section that generates a detection signal that vibrates with an amplitude according to a distance between the intersection point and the conductor on the basis of the alternating current generated in the reception electrode; and
   a detecting section that detects the approach of the conductor to the intersection point on the basis of the amplitude of the detection signal.

2. The detection device according to claim 1,
   wherein the voltage generating section generates the alternating voltage in which at least one of the voltage values after the rise with the first slope and the voltage value after the fall with the second slope is maintained for a predetermined period, and
   wherein the signal generating section generates the detection signal in which the amplitude is maintained for the predetermined period, on the basis of the alternating current.

3. The detection device according to claim 2,
   wherein the signal generating section generates the detection signal obtained by integrating the alternating current generated in the reception electrode, and
   wherein the detecting section detects the approach of the conductor on the basis of comparison of the amplitude of the detection signal with a predetermined threshold value.

4. The detection device according to claim 3, further comprising:
   a waveform generating section that generates a square wave signal formed of square waves,
   wherein the voltage generating section generates the alternating voltage by integrating the square wave signal generated in the waveform generating section.

5. The detection device according to claim 4, further comprising:
   a controller that controls the waveform generating section to change the amplitude of the square waves that form the square wave signal, so as to adjust at least one of the first slope and the second slope.

6. The detection device according to claim 5,
   wherein the voltage generating section generates the alternating voltage having a frequency different from a frequency of noise occurring from the outside.

7. The detection device according to claim 6,
   wherein the transmission electrode and the reception electrode are installed in a display section that displays an image.

8. The detection device according to claim 2,
   wherein the signal generating section generates voltage generated in a resistor that is connected in series to the reception electrode as the detection signal on the basis of the alternating current from the reception electrode.

9. The detection device according to claim 2,
   wherein the signal generating section supplies a different alternating current having the same size as the alternating current to a resistor to generate voltage generated in the resistor as the detection signal using a resistance value of the resistor and a current value of the different alternating current, on the basis the alternating current from the reception electrode.

10. A detection method using a detection device that detects the approach of a conductor,
    the detection device including a sensor section that includes a transmission electrode and a reception electrode that is disposed to intersect with the transmission electrode, and detects the approach of the conductor to an intersection point where the transmission electrode and the reception electrode intersect with each other, the method comprising:
    generating an alternating voltage in which a rise of a voltage value according to a first slope and a fall of the voltage value according to a second slope different from the first slope are alternately repeated, by the detection device;
    applying the alternating voltage to the transmission electrode to generate, in the reception electrode, an alternating current that has a uniform current value according to the first slope while the voltage value of the alternating voltage is rising and a uniform current value according to the second slope while the voltage value of the alternating voltage is falling, by the detection device;

generating a detection signal that vibrates with an amplitude according to a distance between the intersection point and the conductor on the basis of the alternating current generated in the reception electrode, by the detection device; and detecting the approach of the conductor to the intersection point on the basis of the amplitude of the detection signal, by the detection device.

11. A program that causes a computer of a detection device that detects the approach of a conductor, including a sensor section that includes a transmission electrode and a reception electrode that is disposed to intersect with the transmission electrode and detects the approach of the conductor to an intersection point where the transmission electrode and the reception electrode intersect with each other, to function as:

a voltage generating section that generates an alternating voltage in which a rise of a voltage value according to a first slope and a fall of the voltage value according to a second slope different from the first slope are alternately repeated;

a current generating section that applies the alternating voltage to the transmission electrode to generate, in the reception electrode, an alternating current that has a uniform current value according to the first slope while the voltage value of the alternating voltage is rising and a uniform current value according to the second slope while the voltage value of the alternating voltage is falling;

a signal generating section that generates a detection signal that vibrates with an amplitude according to a distance between the intersection point and the conductor on the basis of the alternating current generated in the reception electrode; and a detecting section that detects the approach of the conductor to the intersection point on the basis of the amplitude of the detection signal.

12. A display apparatus that detects the approach of a conductor to a display section, comprising:

a sensor section that includes a transmission electrode and a reception electrode that is disposed to intersect with the transmission electrode, and detects the approach of the conductor to an intersection point where the transmission electrode and the reception electrode intersect with each other;

a voltage generating section that generates an alternating voltage in which a rise of a voltage value according to a first slope and a fall of the voltage value according to a second slope different from the first slope are alternately repeated;

a current generating section that applies the alternating voltage to the transmission electrode to generate, in the reception electrode, an alternating current that has a uniform current value according to the first slope while the voltage value of the alternating voltage is rising and a uniform current value according to the second slope while the voltage value of the alternating voltage is falling;

a signal generating section that generates a detection signal that vibrates with an amplitude according to a distance between the intersection point and the conductor on the basis of the alternating current generated in the reception electrode;

a detecting section that detects the approach of the conductor to the intersection point on the basis of the amplitude of the detection signal; and the display section that is integrally formed with the sensor section and displays an image.

* * * * *